(12) United States Patent
Rodriguez et al.

(10) Patent No.: US 11,952,227 B1
(45) Date of Patent: Apr. 9, 2024

(54) METHOD AND APPARATUS TO FORM A RAISED PROFILE ADHESIVE STRIP

(71) Applicant: Papeltec Overseas, Inc., Atlantic Beach, FL (US)

(72) Inventors: Jason Rodriguez, Jacksonville, FL (US); Craig Austin, Jacksonville, FL (US); Peter A. Rodriguez, Jacksonville, FL (US)

(73) Assignee: Papeltec Overseas, Inc., Atlantic Beach, FL (US)

( * ) Notice: Subject to any disclaimer, the term of this patent is extended or adjusted under 35 U.S.C. 154(b) by 0 days.

(21) Appl. No.: 18/311,420

(22) Filed: May 3, 2023

Related U.S. Application Data

(60) Provisional application No. 63/480,424, filed on Jan. 18, 2023.

(51) Int. Cl.
*B65H 19/26* (2006.01)
*C09J 7/21* (2018.01)

(52) U.S. Cl.
CPC .............. *B65H 19/262* (2013.01); *C09J 7/21* (2018.01); *C09J 2301/16* (2020.08); *C09J 2301/302* (2020.08); *C09J 2400/283* (2013.01)

(58) Field of Classification Search
CPC ....... B65H 19/262; C09J 7/21; C09J 2301/16; C09J 2301/302; C09J 2400/283
See application file for complete search history.

(56) References Cited

U.S. PATENT DOCUMENTS

| | | | |
|---|---|---|---|
| 2,461,246 A | 2/1949 | Theodore | |
| 4,659,029 A | 4/1987 | Rodriguez | |
| 4,757,950 A | 7/1988 | Rodriguez | |
| 4,783,018 A | 11/1988 | Rodriguez | |
| 5,046,675 A * | 9/1991 | Rodriguez ........... | B65H 19/262 242/542.3 |
| 5,417,383 A | 5/1995 | Rodriguez et al. | |
| 5,453,141 A | 9/1995 | Rodriguez | |
| 5,637,170 A | 6/1997 | Rodriguez | |
| 5,954,290 A * | 9/1999 | Rodriguez ........... | B65H 19/262 242/542.3 |
| 6,467,719 B1 | 10/2002 | Rodriguez | |
| 6,578,788 B2 | 6/2003 | Rodriguez et al. | |
| 7,875,152 B2 | 1/2011 | Rodriguez | |
| 8,124,209 B2 | 2/2012 | Rodriguez | |
| 8,178,181 B2 * | 5/2012 | Rodriguez ........... | B65H 19/102 428/41.9 |
| 8,580,062 B2 | 11/2013 | Rodriguez | |

* cited by examiner

*Primary Examiner* — Daniel H Lee
(74) *Attorney, Agent, or Firm* — Tracnik Law PLLC; Joseph P. Kincart

(57) ABSTRACT

Methods and apparatus to form elevated profiles in mounted turn-up raised profile tapes for paper processing. In some embodiments, the raised profile tape may be a combination of a tape substrate coated on one side with a web grabbing adhesive and on the other side with a mounting adhesive and a release liner having a release liner substrate fully coated on a first side with a release layer and zone-coated on a second side with a release layer. In some embodiments, an elevated profile may be formed during the application of the raised profile tape with specialized apparatus.

20 Claims, 18 Drawing Sheets

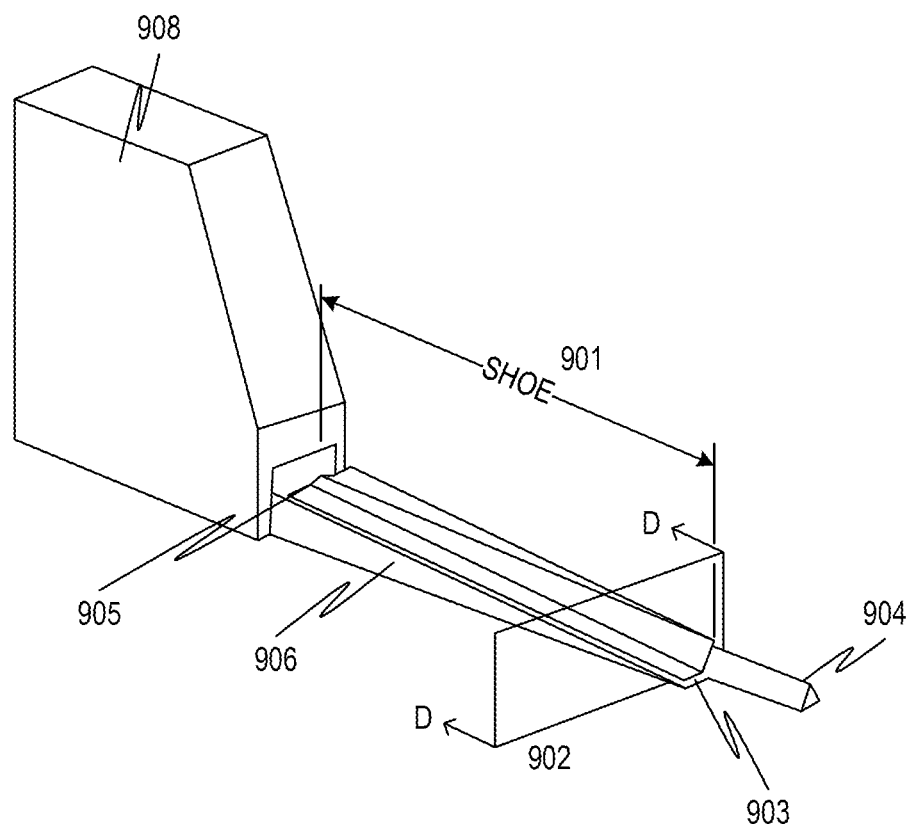
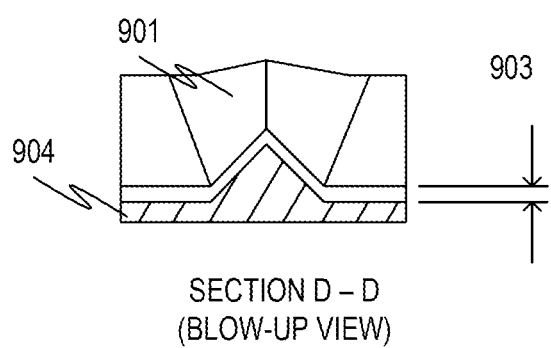
SECTION D – D
(BLOW-UP VIEW)
FIG. 9

METHOD AND APPARATUS TO FORM A RAISED PROFILE ADHESIVE STRIP

CROSS REFERENCE TO RELATED APPLICATIONS

The present application claims the benefit of Provisional Patent Application Ser. No. 63/480,424, filed on Jan. 18, 2023, entitled METHODS AND APPARATUS FOR FORMING A RAISED PROFILE ADHESIVE SUBSTRATE; the entire contents of which are incorporated herein by reference.

FIELD OF THE INVENTION

This invention relates generally to apparatus and methods forming an adhesive strip with a raised profile; and more particularly to forming a raised profile turn-up tape for high-speed severing and transfer of a rapidly advancing paper web from a rotating full web spool onto an empty web spool.

BACKGROUND OF THE INVENTION

Flat adhesive tape is a known product that has been demonstrated to be useful for multiple different applications. Variations in adhesives and substrates used in flat adhesive tapes have been varied to suit a particular type of application. One use of a flat adhesive tape includes a paper machine turn-up process, which uses a flat paperband constructed with attributes conducive for adhering to an empty paper spool and transferring a paper web from a full spool to the empty spool.

Modern paper manufacturing is typically performed by producing continuous lengths of paper having widths of over 400 inches in some cases, referred to as paper webs, which are wound onto web spools for subsequent converting, storage, transfer, or the like. The winding or spooling operation for the paper web, such as in the case of tissue grades, occurs at high speeds, in some cases exceeding 6000 feet per minute, and in order to maximize production by minimizing downtime and waste, it is desirable to sever and simultaneously transfer the moving paper web from a full web spool onto an empty web spool without stopping, adjusting draws (i.e. the speed differential between the incoming and outgoing web rotating support members that are not driven by a common source) or slowing the movement of the web. If a gap exists between the empty spool and the surface of the paper web, it must be overcome to perform the paper web turn-up process.

Other uses of a flat tape include securing items to a surface, and/or fastening two disparate surfaces together.

SUMMARY OF THE INVENTION

Accordingly, the present invention provides apparatus and methods to generate a 3-dimensional profile in a 2-dimensional substrate, such as a tape with adhesive on one or both sides. A 3-dimensional profile may include for example a profile with a peak or dome or other apex forming shape.

In one general aspect, methods of the present invention may include coiling a substrate in a dispenser and positioning the substrate parallel to a receiving surface with a roller. The substrate may be dispensed in a plane parallel to the receiving surface. The substrate is shaped with a forming profile along a longitudinal axis to create a 3-dimensional substrate, and the 3-dimensional substrate may be applied to the receiving surface.

Implementations may additionally include the step of moving the substrate along progressive gradients of 3-dimensional change included in the forming profile; forming the substrate with wheels and the forming profile.

In some embodiments at least a portion of the substrate may be protected from air borne contaminants with a cover, the air borne contaminants may include paper particles.

Methods of the present invention may additionally include changing a length of the forming profile surface via extension of a telescopic wand. A paper web may be contacted with a peak having the 3-dimensional substrate shaped with the forming profile, and in some embodiments, the peak may be compressed as an empty spool approaches the paper web.

In another aspect, a distance between the dispenser and the receiving surface may be maintained with one or more wheels positioned on the dispenser. Additionally, a distance and angle of the wand from the receiving surface may be maintained with one or more wheels on a distal end of the wand.

In some embodiments, portions of a flat adhesive strip may be elevated and used as a raised profile tape in a paper machine turn-up process. By elevating portions of an adhesive strip usable as a turn-up raised profile tape, the elevated portion increases a profile height of the raised profile tape which may be used to fill an open nip, without having to increase a thickness of the entire tape. A benefit may also be derived from forces involved in manipulating a shape of a raised profile of the elevated portions of the flat adhesive strip such that the energy serves to augment the severing of the web. Additionally, a raised portion of the raised profile tape may be deformed during use and made to comply with a height of a gap encountered.

In some embodiments, portions of the raised profile tape may be elevated by apparatus and methods described herein and may result in a raised profile adhesive strip with a contained under surface volume filled with atmospheric gases. Additional embodiments include some, or all, of the undersurface volume containing a continuous article, such as, by way of non-limiting example, one or more of a: cable, wire, and filament. Embodiments may also include multiple disparate items placed within the undersurface volume, such as, by way of non-limiting example, a bead, an electronic device, an electro-mechanical device, a sensor, a transceiver, and a pulpable fiber article in various shapes. Items in the undersurface volume that are included into a structure of a raised profile tape may provide support, texture, and stiffening of the raised profile tape. In some preferred embodiments, a raised profile tape construct is made up of material suitable to be re-pulped and included in the paper product. The suitability to be re-pulped may significantly reduce waste in paper processing.

In some embodiments, the present invention may include methods with process steps including, one or more of: retaining a coil of two-dimensional substrate with an adhesive layer in a dispenser; dispensing the substrate onto a dimensional forming feature; reshaping the substrate to form the substrate with a three dimensional profile based upon a shape of the dimensional forming feature; and adhering the substrate with the three dimensional profile to a receiving surface of an empty web spool.

Implementations may include one or more of the following additional process steps: spinning the empty web spool and the substrate with the three dimensional profile; adhering of the adhesive layer to a paper web on a full web spool; severing the paper web; and continuing to spin the empty web spool and the substrate with the three dimensional profile to form a roll of paper web on the empty web spool.

Method additionally include one or more steps including: attaching a distal end of the Substrate with the three dimensional profile at a second position on the empty web spool; protecting at least a portion of the adhesive layer from air borne contaminants with a cover on the dispenser, where the air borne contaminants may include paper particles; forming a peak having the substrate and the adhesive layer by placing a rod beneath the adhesive layer; contacting the paper web with the peak having the substrate and the adhesive layer; compressing the peak having the substrate and the adhesive layer as the empty web spool approaches the paper web; and following the collapsing of the peak having the pulpable substrate and the adhesive layer, contacting and bonding additional surface area of the adhesive layer with the paper web.

Still further some embodiments may additionally include one or more of the step of: crushing the peak. The substrate may include one or more materials suitable to be re-pulped and included in a paper product. The substrate may be adhered to the paper web with the adhesive layer. The adhesive layer may include a pressure sensitive coating.

In some embodiments, the Substrate with the three dimensional profile may include multiple kiss-cuts and the multiple kiss-cuts may be placed at one or both of a width of the Substrate with the three dimensional profile. A release layer may include a portion of a surface treated with a reduced adhesion strength substance and the reduced adhesion strength substance may include a silicon based formulation. Still further, the Substrate with the three dimensional profile may include a carrier paper with a repeating pattern of stripes of release coating.

Methods and apparatuses for accomplishing severing and transfer utilizing what is known as a transfer or turn-up tape have been described. An early example of such a system is shown in U.S. Pat. No. 2,461,246 to Weyenberg. Other examples are shown in U.S. Pat. Nos. 4,659,029, 4,757,950, 4,783,018, 5,046,675, 5,453,141, 5,637,170, and 5,954,290. Further examples and detailed discussion of related equipment, systems and methodologies are present in U.S. Pat. Nos. 4,659,029, 4,757,950, 4,783,018, 5,046,675, 5,417,383, 5,453,141, 5,637,170, 5,954,290, 6,467,719, 6,578,788, 7,875,152, 8,124,209, 8,178,181 and 8,580,062, the disclosures of which are incorporated herein by reference in their entirety.

BRIEF DESCRIPTION OF THE DRAWINGS

With reference to the drawings, which are provided for descriptive and illustrative purposes are which are not meant to be limiting as the scope of the invention, the invention in various embodiments in a broad and general sense includes apparatus and methods for dispensing multi-layer adhesive tape with a raised profile tape, such as a tape useful in a paper web turn-up operation.

FIG. 1A illustrates an enlarged view of an exemplary raised profile turn-up tape construct for Turn-Up.

FIG. 2A illustrates an enlarged view of an exemplary raised profile turn-up tape construct as it approaches a Nip.

FIG. 3A illustrates an enlarged view of an exemplary Cover Flap transfer paper construct as it is compressed.

FIG. 4A illustrates an exploded view of a raised profile turn-up tape construct as it adheres to the advancing paper web.

FIG. 9 illustrates a schematic diagram of guide at a set position relative to a 3-dimensional forming feature.

DETAILED DESCRIPTION OF THE INVENTION

Figure 1:
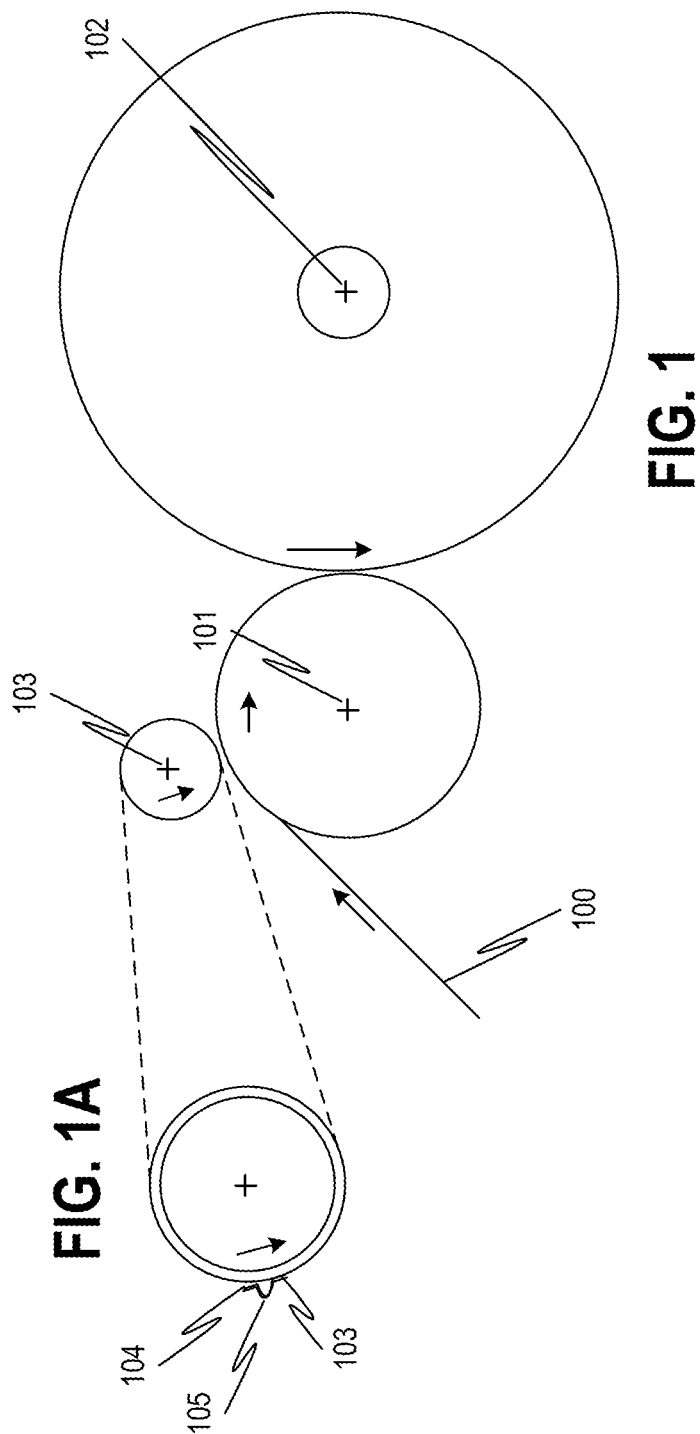
FIG. 1 is an illustration of a paper processing system with an Empty Web Spool set up for paper web transfer.

The present invention provides for apparatus and methods to form a raised profile tape from a two-dimensional adhesive substrate. A portion of the raised profile tape may include adhesive on one or both sides. A forming structure with a 3-dimensional forming feature may impart a gradual transformation of a 2-dimensional substrate into a substrate with a 3-dimensional profile. In some embodiments, a rate of taper and corresponding length of a forming structure, such as a wand, is designed to impart a controlled amount of stress into the substrate being formed. In some embodiments, a rate of taper and corresponding length of a wand is controllable by a user via a telescopic wand that allows a user to adjust a rate of graduation of transformation of the 2-dimensional substrate into a substrate with a 3-dimensional profile. The wand may include a forming feature and a length of the wand may include a progressive gradient in the forming feature, such that a proximal end of a wand may impart a least amount of forming and a distal end may impart a greater amount of forming.

Embodiments may include a formed dual-sided adhesive tape with a raised profile may be useful for severing and transferring a paper web, the raised profile tape includes a substrate with a first adhesive side, the spool mounting side, preferably included of a pressure sensitive adhesive, adapted to contact and adhere to the longitudinal cylindrical surface of the empty web spool. The opposite side of the raised profile tape substrate, the web-side (or web grabbing side), has a second adhesive side adapted to contact and adhere to the moving paper web when the rotating empty web spool is brought into contact with the paper web. With the adhesion of the paper web to the empty web spool through this raised profile tape, the web may be severed from the full web spool and its new leading edge, formed at the severing line created by the raised profile tape, may adhere to the rotating empty web spool, thus completing the transfer.

Some embodiments of the present invention include a raised profile tape with a cover flap extending over the web-side adhesive on the substrate of the raised profile tape, the cover flap being longitudinally adhered along one edge of the raised profile tape, wherein the cover flap is provided with a release coating, such as a silicone layer, over the majority of the side of the cover flap facing the adhesive side. With such a construction, the cover flap may remain closed to protect the web-side adhesive from contaminants such as dust and debris until the empty web spool is spun up to its speed to match the speed of the web. As the empty web spool rotates, the cover flap peels back due to aerodynamic effects, pulling the release-coated section of the flap away from the adhesive. The cover flap opens at its leading edge, which is the edge of the raised profile tape first encountering the resulting airstream due to the rotation of the empty web spool. The cover flap remains attached to the web-side adhesive at the trailing edge of the raised profile tape due to the flap being void of the silicone release layer in that narrow region. The raised profile tape is now in a state with its protective cover flap peeled back to expose the fresh and uncontaminated adhesive and is able to adhere to the subject paper web to sever and transfer it to the empty web spool.

In some embodiments, the effectiveness of the transfer process may be limited because the interaction of the paper tape with the paper web may not be optimal. It may be advantageous to elevate at least a portion of an adhesive coated portion of the paper tape above the web spool.

Elevating portions of an attached raised profile tape may increase the profile of the raised profile tape sufficiently to fill an open nip. There may also be the benefit of concentrating the forces involved in crushing 3-dimensional profile such that the energy serves to augment severing of a contacted web.

Embodiments of the present disclosure may include a method for performing a turn-up process on a paper making machine, the process including the steps of mounting a proximal end of a Raised Profile Tape Composite at a first position on an empty web spool, the Raised Profile Tape Composite including folded layers of adhesive, release coating, and pulpable substrate with a raised profile portion forming a peak with the pulpable substrate and layer of adhesive. The raised profile may include the pulpable substrate and layer of adhesive, bridging a gap between the empty web spool and a surface of a paper web rotating on a full web spool. Embodiments may also include adhering the adhesive layer to the paper web. Embodiments may also include continuing to spin the empty web spool and the Raised Profile Tape Composite until the paper web severs via separation of fibers included in the paper web.

In some embodiments, the method may additionally include the step of continuing to spin the empty web spool and the Raised Profile Tape Composite following the adhering of the adhesive layer to the paper web and the paper web severs, to form a roll of paper web on the empty web spool. In some embodiments, the method additionally may include the step of attaching the distal end of the Raised Profile Tape Composite to a second position of the empty web spool.

In some embodiments, the method may still further include the step of protecting at least a portion of the adhesive layer from air borne contaminants with the folded layers of adhesive, release coatings, and pulpable substrate. In some embodiments, the air borne contaminants may include paper particles.

Glossary

Composite: as used herein a Composite means an item made up of distinct parts or elements.

Empty Spool: as used herein an Empty Spool (sometimes referred to as an Empty Reel, a New Spool, a Reel Spool, Web Spool, or an Empty Spool), means a Spool with a Spool Face essentially devoid of Paper Web. The Spool Face is suitable for a Paperband Composite to be wound around, and removably attached to. The Spool Face of an Empty Spool is commonly used to adhere a Transfer Tape upon and receive Paper Web transferred from being accumulated onto a Full Spool.

Full Spool: as used herein a Full Spool (which may sometimes be referred to as a Full Web Roll, and/or a Full Roll), refers to a Web Spool that is substantially nearing its capacity for holding Paper Web.

Nip: as used here Nip refers to the area where a Paper Web or sheet is pressed between two Roll s/Spool s.

Turn-up Tape Composite: as used herein means a paper band with a first side and a second side, the first side having at least one layer of adhesive. A Turn-up Tape Composite may include multiple distinct elements and/or parts.

Paper Web: as used herein refers to a newly formed continuum of paper that is processed and rolled on a paper-making machine.

Raised Profile Tape Composite: as used herein refers to at least one layer of structural materials, such as paper fiber, along with at least one layer of adhesive material forming a Turn-up Tape with a profile including a raised portion.

Reel Drum: as used herein a Reel Drum refers to a Spool used to drive movement of a Paper Web; in some embodiments a Reel Drum may impart rotational movement to a Web Spool receiving a Paper Web in a reeling action.

Transfer Tape: as used herein a Transfer Tape (sometimes referred to as a turn-up tape, or Paper Band), refers to a substrate adapted for extending across a longitudinal cylindrical surface of one or both of an Empty Spool and a paper bearing Web Spool. The Transfer Tape may include multiple layers.

Turn-Up: as used herein, a Turn-Up means a process involving switching a Paper Web from spooling on a nearly completed Full Spool to spooling on an Empty Spool. A Turn-up Process may include severing a Paper Web from a rotating parent web roll nearing its capacity to hold paper, transferring the Paper Web to an Empty Spool, and securing the Paper Web to the Empty Spool.

Web Spool: as used herein a Web Spool means a metal roll onto which a web, such as, for example a Paper Web, is wound during a reeling operation. A Web Spool may also be referred to as a Reel Spool. A Web Spool may include an Empty Spool, a Full Spool, and/or Parent Roll.

The present invention provides improved methods of utilizing a Raised Profile Tape Composite to sever and transfer a continuous paper web from one spool to another spool, such as may be especially useful in transferring lightweight papers such as tissue or newsprint to an Empty Web Spool. The Raised Profile Tape Composite may be applied to an Empty Web Spool in a closed position such that the Raised Profile is temporarily adhered in a portion of its surface and opens during the run up in the speed of the spool to which it is attached due both to aerodynamic forces and to centrifugal force. In examples of the present application, the construct is produced so that when the Raised Profile opens, adhesive layers open with the Raised Profile presenting adhesive off of the surface of the spool. Adhesive layers may be elevated to interact with the paper web.

In operation, the present invention provides methods and apparatus to create and apply a Raised Profile Transfer Tape to an empty spool for the transfer of a Paper Web from a full spool to the empty spool without requiring a flow of the Paper Web to be altered or stopped. It is to be understood that disclosure of the apparatus and method in relation to a paper web turn-up operation is an exemplary disclosure not meant to be limiting, as the Raised Profile Tape Composite, methods of the Raised Profile Tape Composite manufacture, and associated methods of application may be suitable for use in diverse configurations.

According to the present invention, a Raised Profile Tape Composite may be produced by assembling layers of structural materials, such as paper, along with layers of adhesive material, such as double stick adhesive tapes. Coatings of various kinds may be applied to the surfaces of the layers to alter properties of the surface. A release layer may be performed by coating a portion of a surface, such as with a silicone coating, which renders the surface as less adherent to an adhesive that may be attached to it. In a non-limiting example, if a portion of a surface of a structural layer is coated with a release coating, then an attached adhesive layer will form a strong bond with the uncoated portion and a weaker bond with the coated portion such that when forces are applied the adhesive will separate from the coated surface and lift up.

Referring to FIG. 1, a step of a paper Turn-Up process utilizing the concepts of the present specification is illustrated. As illustrated a Raised Profile Tape Composite 105 has been arranged on an Empty Web Spool 103. The Empty Web Spool 103 may be used to take up the new Paper Web 100 as it is moved by the Reel Drum 101 in the direction as shown by the arrows. At the starting step, the Full Web Spool 102 is approaching its capacity to take up the Paper Web 100. In the inset figure, FIG. 1A, an enlarged view of the Empty Web Spool 103 is illustrated. on the surface of the Empty Web Spool 103 is the Raised Profile Tape Composite 105 which is held to the Empty Web Spool 103 with an Adhesive Layer 104.

Figure 2:
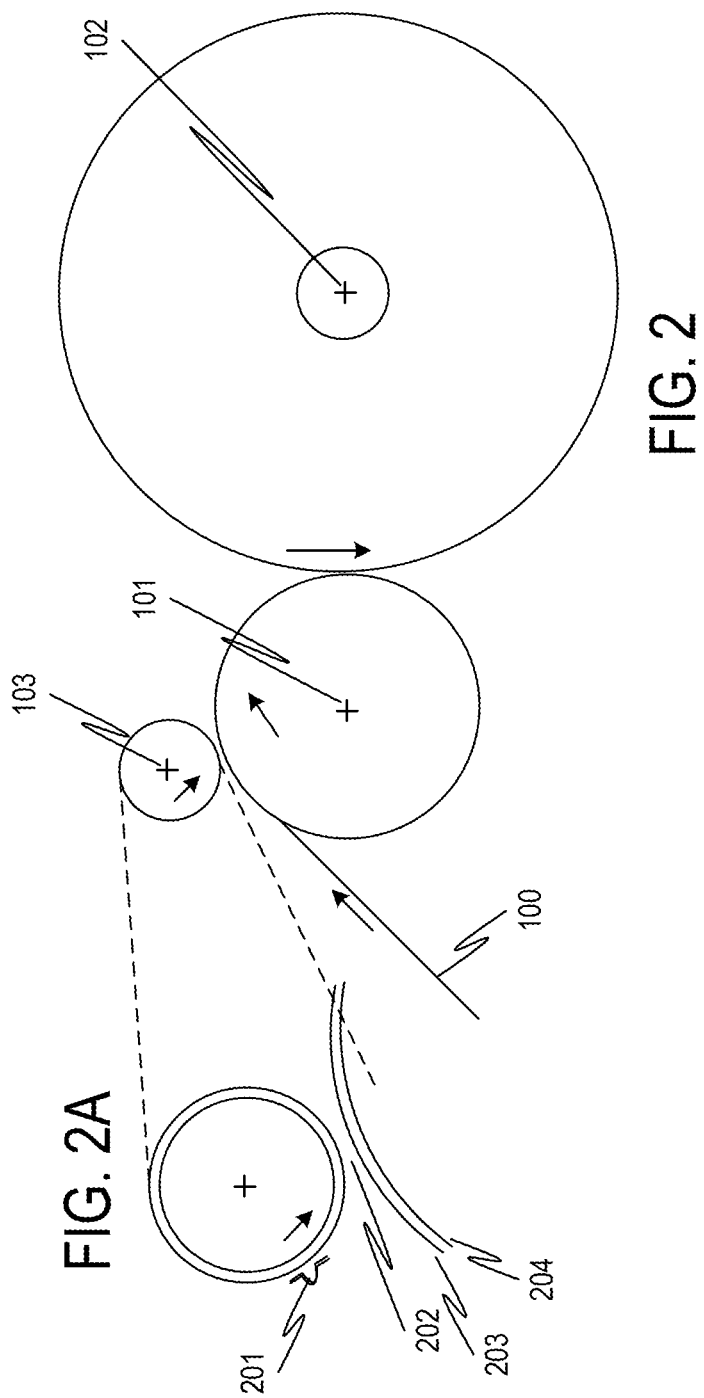
FIG. 2 illustrates a paper processing system with a raised profile turn-up tape construct approaching a Nip.

Referring now to FIG. 2, the Empty Web Spool 103 approaches a Nip 202 as it moves towards the Reel Drum 101. The Paper Web 100, is still wrapping to the Full Web Spool 102. As displayed in FIG. 2A, the mounted Raised Profile Tape Composite 201 sits on the surface of the Empty Web Spool 103. As the Empty Web Spool approaches the Nip 202 it will contact the Paper Web 203 which is upon the Reel Drum Surface 204 and be rotated as shown by the arrows. Rotation may be accomplished, for example, via an electric or air powered motor (not illustrated). In some examples, the motor described may bring the Empty Web Spool 103 up to speed prior to it approaching the spool and closing the Nip 202.

A rotary speed (rotations per minute) of the Empty Web Spool 103 may be such that a surface speed of the Empty Web Spool 103 equals that of the Paper Web 100 and Reel Drum 101 surface. During the run up of that speed, the raised profile of the mounted Raised Profile Tape Composite 201 may lift as the spool rotational speed increases the centrifugal force on the mounted Raised Profile Tape Composite 201.

The rotation may bring the mounted Raised Profile Tape Composite 201 into the Nip 202 which will put pressure onto the exposed adhesive surface. In some examples, the Raised Profile adhesive will approach the Paper Web 100 when the Empty Web Spool 103 is brought into close contact with the Paper Web 100 on the Reel Drum 101 and compresses the mounted Raised Profile Tape Composite 201.

Figure 3:
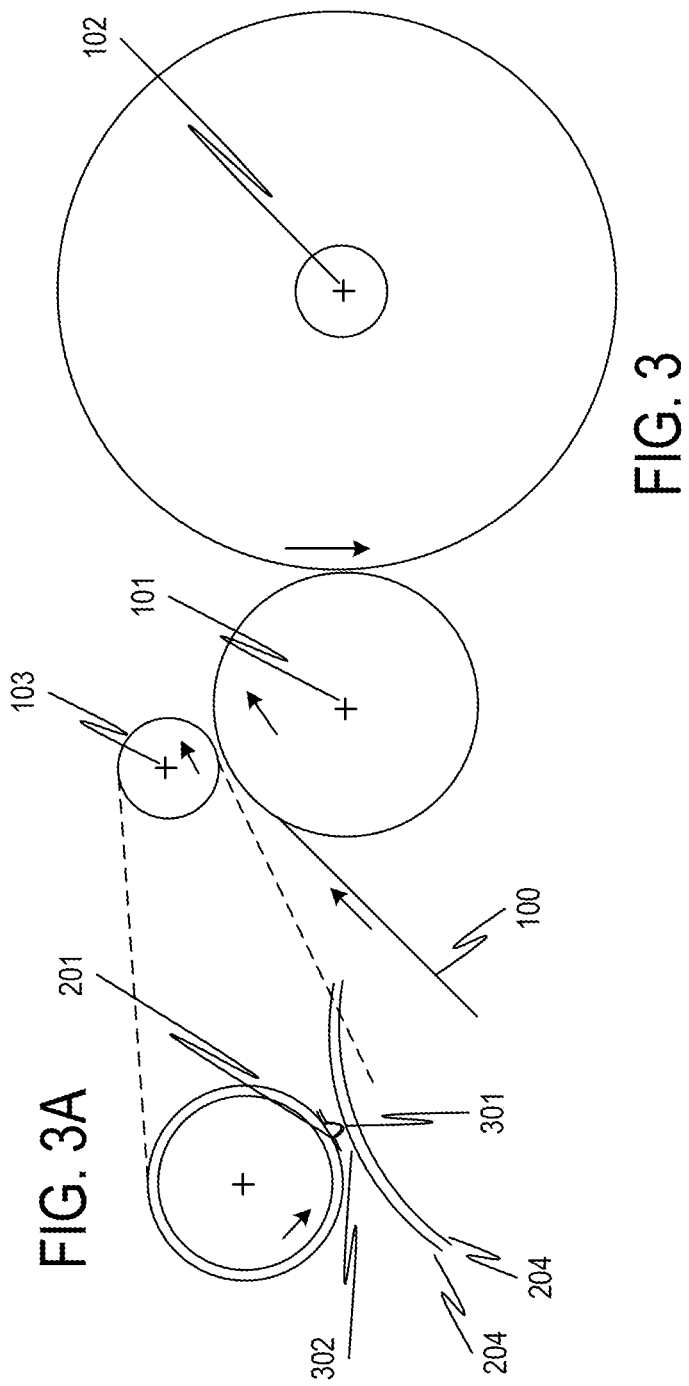
FIG. 3 illustrates a paper processing system with the raised profile turn-up tape construct compressed between an Empty Web Spool and a reel drum.

In an example, proceeding now to FIGS. 3 and 3A, when the mounted Raised Profile Tape Composite 201 is in the Nip 302, the Raised Profile 301 of the mounted Raised Profile Tape Composite 201, may be pressed to adhere to the Paper Web 100 in the Nip 302. It may be noted that the proportions of the components in the figures may be exaggerated for the thickness or relative size to the spool and are illustrated for purposes of clarity.

Figure 4:
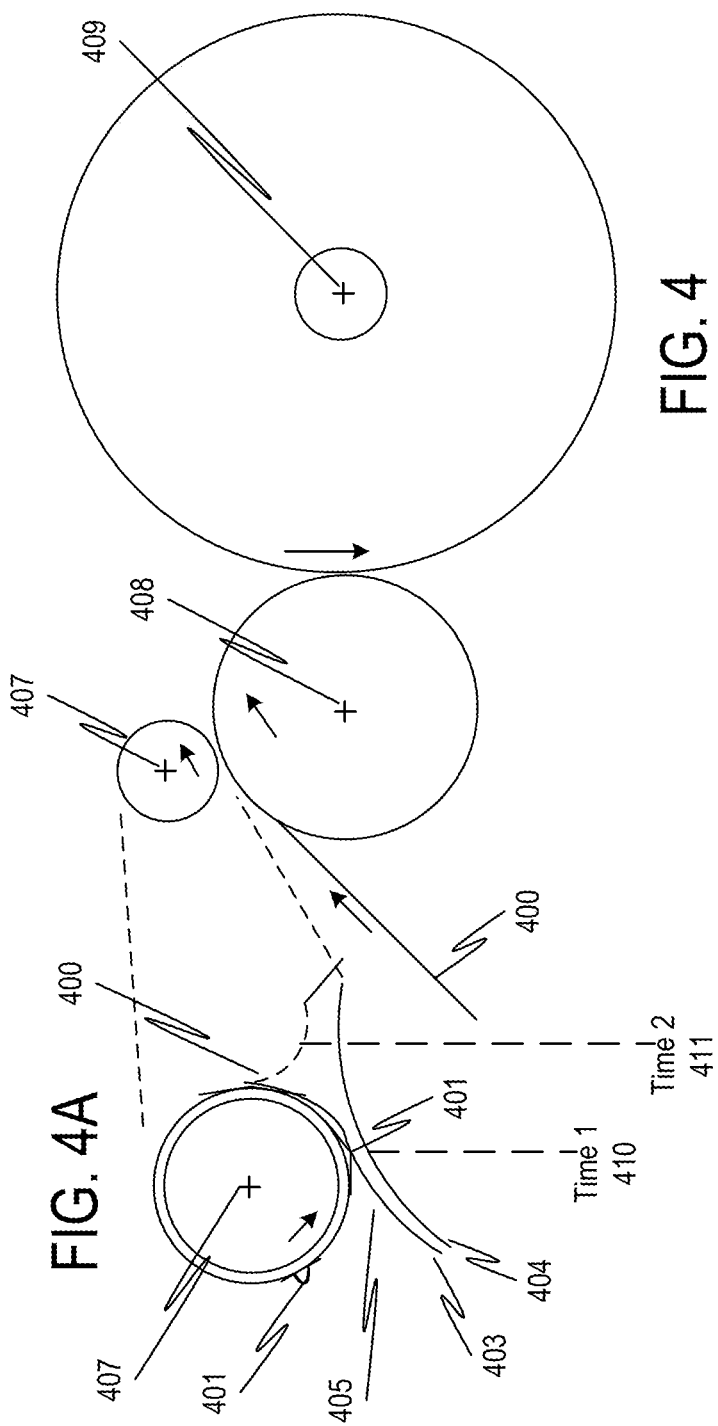
FIG. 4 illustrates a paper processing system where the raised profile turn-up tape construct adheres to an advancing paper web.

Referring now to both FIGS. 4 and 4A, a schematic diagram illustrates how adhesion of the Paper Web 400 is made as the Reel Drum 408 rotates, and, at Time 1 (410), the Raised Profile Tape Composite 401 is compressed in the Nip 405 and adheres to the Paper Web 400, and lifts the Paper Web 400 toward the Empty Web Spool 407. At Time 2 (411), the Raised Profile Tape Composite 401 location is rotating out of the Nip 405 as new paper from the Paper Web 400 is adhered by the Raised Profile Tape Composite 401 and begins to be wound to the Empty Web Spool 407. The Paper Web 400 continues to be wound to the Empty Web Spool 407 the Empty Web Spool 407 becomes a Full Web Spool 409 As discussed, the illustrations are exemplary and are provided to illustrate fundamental aspects of various embodiments. The scales of the illustrations are not intended to be limiting, such as for example, the relative dimensions of an adhesive layer when compared to paper thickness, nip distance, and spool dimensions.

Figure 5:
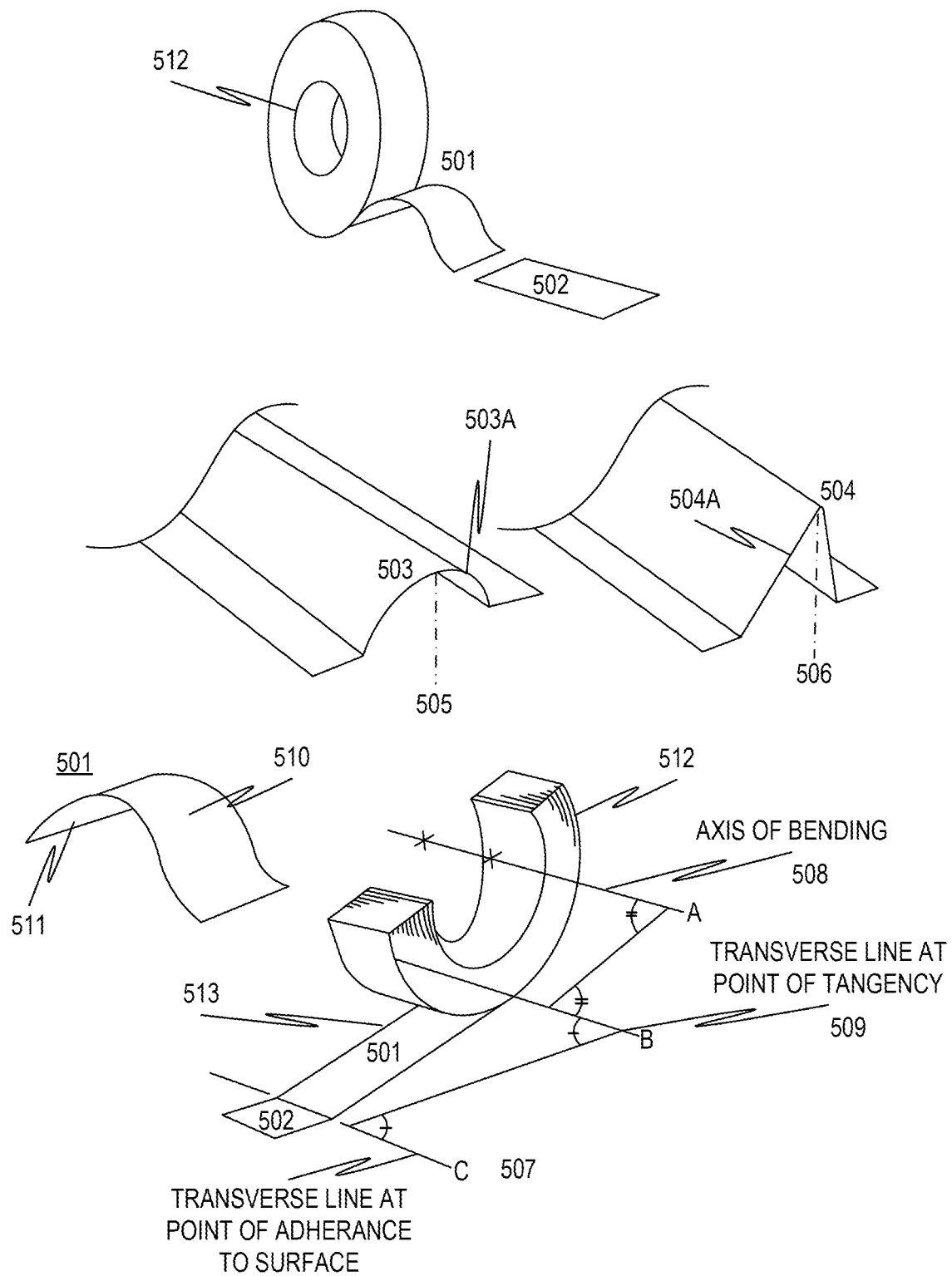
FIG. 5 illustrates a paper processing system where a Turn-Up has occurred.

Referring now to FIG. 5, a Two-Dimensional Substrate 501 (which may include adhesive substrate, such as a flat substrate with adhesive on one or both sides) is illustrated in a coiled packaged format of the Substrate 501 and an Unwound Segment 502 of the Substrate 501 suitable for many uses. According to the present invention, the use of the Substrate 501 that is flat and coated with adhesive is expanded by forming or otherwise reshaping the Substrate 501 to include a Three-Dimensional Aspect 503A-504A in the Substrate 501. A Three-Dimensional Aspect may include, for example, an Arcuate-Shaped Apex 503 and/or a Raised Angular Apex 504. As illustrated, an Apex 503 may be in a Center 505, 506 of a width of the Substrate 501 with adhesive. In other embodiments, an Apex 503 may be offset from a Center Line 505, 506 to better address a particular use for the Substrate 501.

Applications that utilize a Substrate 501 with adhesive as a turn-up tape, allow rotation of an empty spool onto which the Substrate 501 is adhered to bring a Three-Dimensional Aspect 503A-504A (such as a rise) in the Adhesive Substrate 501 into a Nip which will put pressure onto an exposed adhesive surface. In some examples, an Apex 503-504 of the Three-Dimensional Aspect 503A-504A in the Substrate 501 will approach a Paper Web when an Empty Web Spool is brought into close contact with the paper web on the reel drum and compresses the Adhesive Substrate 501.

Other useful applications for a Substrate 501 are expanded to applications where the Substrate 501 with adhesive is applied with three dimensional configurations.

Achieving specialized three-dimensional configurations is prevented, or made more complicated by adhesive characteristics of a tape that adheres to surfaces, tools, fingers, and itself when a user attempts to apply it to achieve complex configurations.

The present invention provides devices, apparatus, and methods for dispensing, preparing, and placing Substrate 501 (with one or both of a: First Side 510 and a Second Side 511 being coated with an adhesive) into a shape with a 3-dimensional profile. In some embodiments, a thin, non-elastic web may be formed into a 3-dimensional structure constrained at both ends, while controlling or compensating for the co-planar transverse and longitudinal stresses with little or no permanent deformation of the tape apart from achieving a 3-dimensional profile.

The Substrate 501 may be constrained first by a Cylindrical Roll 512 that only requires the Substrate 501 to be arched about an Axis 508 parallel to a plane of the Substrate 501. As the Substrate 501 is drawn from the Cylindrical Roll 512, the Substrate 501 unwinds to a flat unwound 2-Dimensional Configuration 513 and is constrained at the Transverse Line 507 at a Point Tangent 509 with the roll.

The Substrate 501 may also be constrained where it is adhered to a surface to which it is applied. In a simple model of a transfer of the Substrate 501 from a Roll 512 to a surface (not illustrated in FIG. 5), an Axis of Bending 508, a Transverse Line 507 at the Point of Tangency 509, and the Transverse Line 507 at a point of adherence to a surface may be parallel.

In some embodiments, with a small amount of twisting, or no twisting, of the Roll 512 relative to the long axis of the free span of the tape, and no transverse displacement of the Roll 512 relative to the free span of the tape, then in a static state (without a tensile load), stress on the web may be insignificant. However, if the Roll 512 is twisted about the longitudinal centerline of the free span, wrinkles may be introduced (as illustrated in FIG. 5B).

Figure 5A:
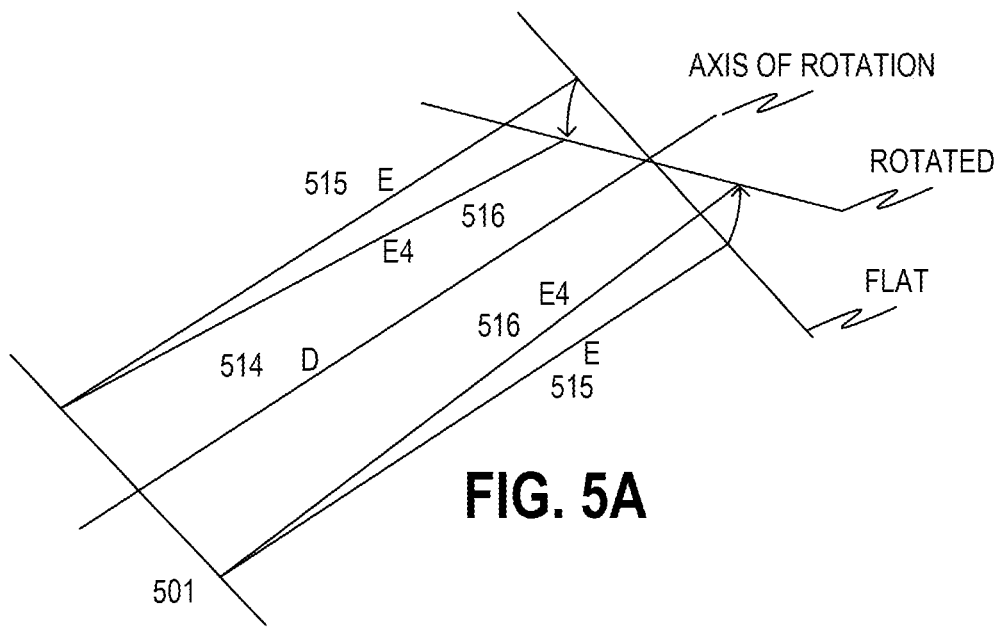
FIG. 5A illustrates an exploded view of an exemplary paper processing system where a Turn-Up has occurred.
Figure 5B:
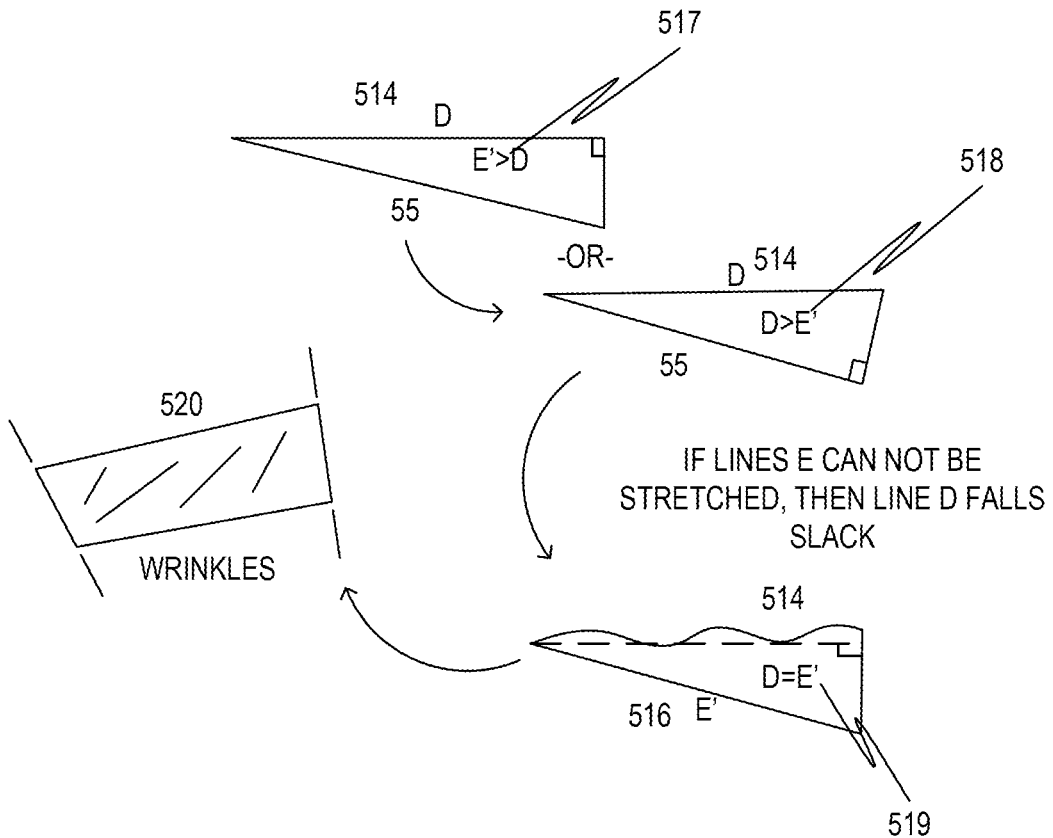
FIG. 5B illustrates an exemplary longitudinal center line of a free span.

Referring now to FIG. 5A, prior to twisting, Lines E 515 and D 514 have a generally equal length. After twisting, Lines E' 516 are longer than Line D 514 (if the web or other substrate is capable of being stretched), or Line D 514 may be shorter than Lines E' 515 (if the web is not capable of being stretched). If Line E' 516 cannot be stretched, and D=E' 519 then Line D 514 falls slack.

Twisting may generally describe displacement of any point along a plane to a position away from the plane. If the Substrate 501 is flat as it is drawn from a Roll 512, and a 3-dimensional profile is to be created, Wrinkles 520 may form by the offset of a point of the plane.

Another dynamic that may be encountered in creation of a three-dimensional profile from a 2D tape that includes increasing a three-dimensional height of the Substrate 501 between edges adhered to a Surface 510-511, may include narrowing of the resulting profile. As a perimeter of a cross section of a Substrate 501 does not change, displacing a point from the plane exerts a force tending to draw edges of the Substrate 501 together, which either constricts the edges or stretches the Substrate 501.

Additionally, when a long axis of a portion of a 2-dimensional Substrate 501 with adhesive tape changes direction (is bent) along a plane it is lying on to attach edges of a 3D profile, then some variables are preferably addressed.

Referring now to FIG. 5B, in those situations where Line E' is greater than Line D (517), or Line D is greater than Line E' (518), then if the Substrate 501 is not stretchable, Line D will become slack and/or Wrinkle 520.

Figure 6:
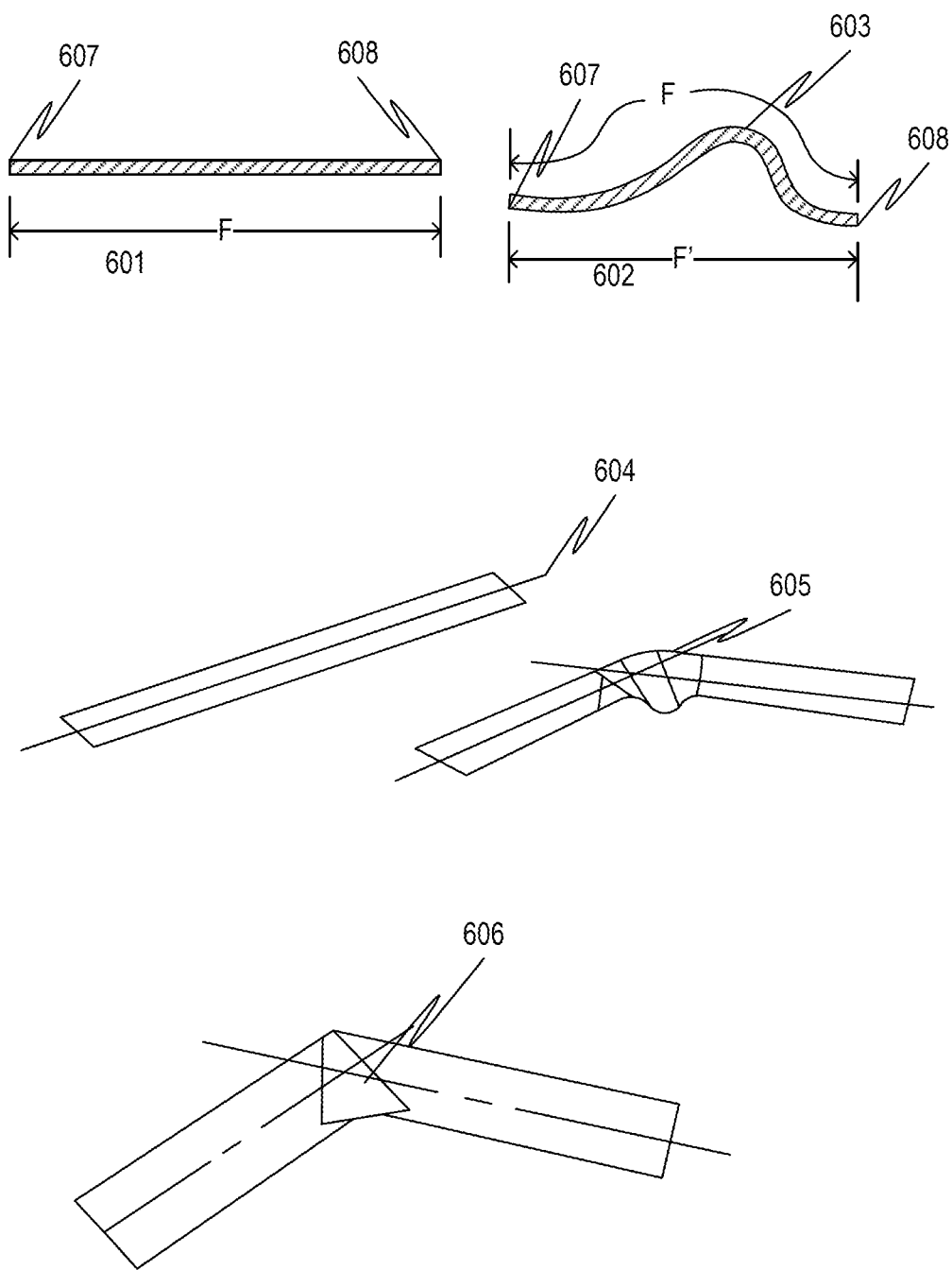
FIG. 6 illustrates a schematic diagram of substrate formed with an apex.

Referring now to FIG. 6, in some embodiments, it is preferred to maintain a fixed perimeter of a portion of Substrate 601 (such as, in those cases that it is not desirable for a substrate to be deformed). In such embodiments, a portion of the Substrate 601 may be shaped to form an Apex 603, or other 3-Dimensional feature, by drawing Edges 607-608 of the Substrate 601 together and decreasing a Width F 601 of the Substrate 601. Drawing the Edges 607-608 creates a more narrow Footprint F' 602 of the adhesive Substrate 601.

If a portion of a Substrate 604 can neither stretch nor shrink, then bending the longitudinal axis of the Adhesive Substrate 604 causes deformations, such as "Wrinkles" 605. An outside edge of the Adhesive Substrate 604 will determine a "length" of the Adhesive Substrate 604, such that an opposite edge of the Adhesive Substrate 604 on an inside of a curve formed by the Adhesive Substrate 604 becomes too long to lay flat (unless it is compressible), force on the Adhesive Substrate 604 to bend the Adhesive Substrate 604 also causes deformations with the over long portion of adhesive tape on the interior or a curve. Deformation may include, for example, one or more Humps 606.

Figure 7:
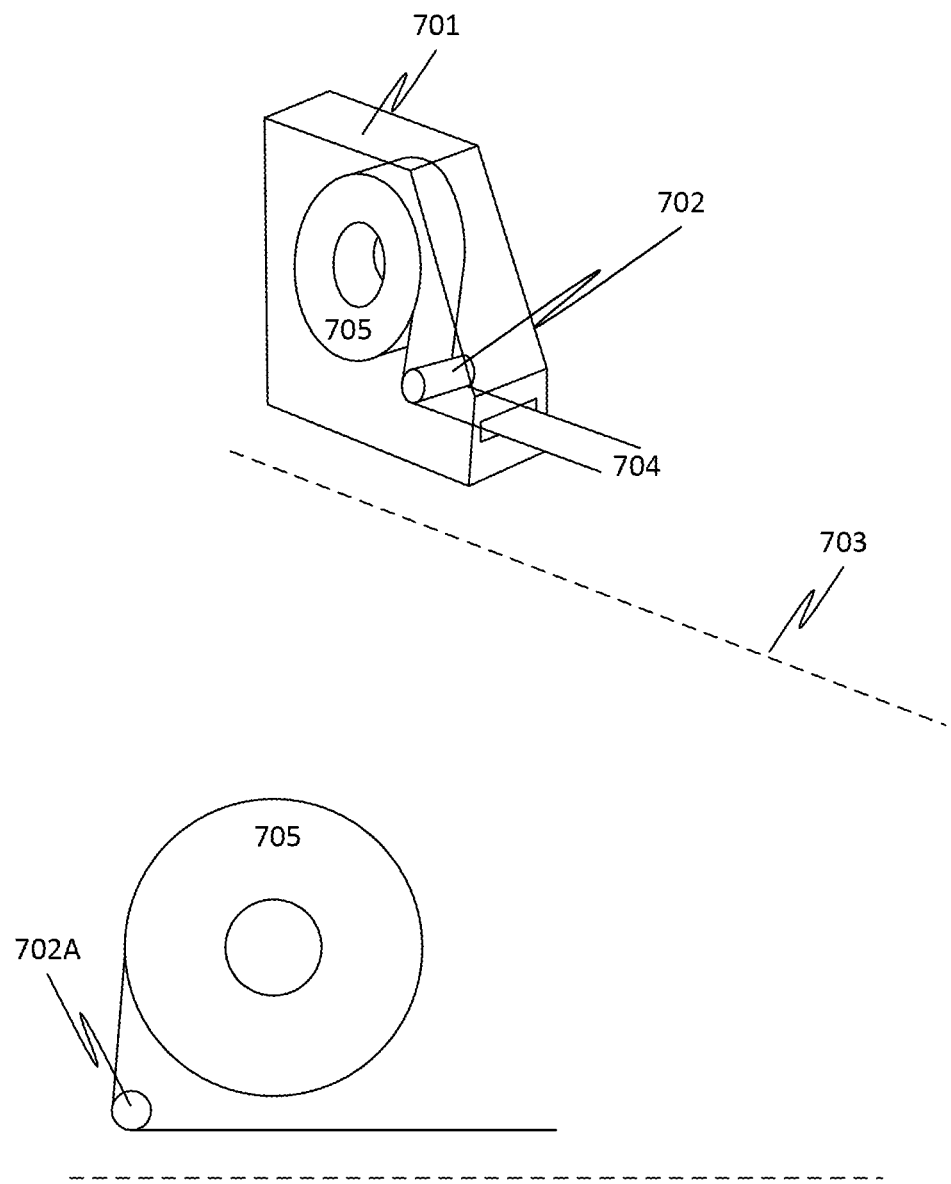
FIG. 7 illustrates a schematic diagram of a reeled storage of a substrate.

Referring now to FIG. 7, a Reeled Storage Dispenser 701 is illustrated for a Substrate 705 with a first flat surface (such as an upper surface) and a second flat surface (such as a lower surface). If the Substrate 705 is an adhesive substrate it will include one or more layers of adhesive applied to one or both flat surfaces. The Reeled Storage Dispenser will include a Dispensing Roller 702 to dispense the Substrate 705 with a Dispensed Portion 704 generally parallel to Plane 703. In some embodiments, the Plane 703 may be an application surface, or a shape forming plane.

In some embodiments, a 3-dimensional profile is created from a 2-dimensional substrate in a continuous process. In preferred embodiments, the process includes effective control of differential lengths of lines parallel to edges of the substrate. In implementations where it is desirable that a formed 3-dimensional profile is consistent along its length, it is preferred that the edges be parallel to each other. Parallel edges may then be parallel to another longitudinal line useful to the profile.

Some preferred embodiments include a Substrate 705 that is formable (may be expanded and contracted in one or more dimensions). The formable aspect of the Substrate 705 may be manipulated to avoid, decrease, and/or eliminate wrinkles in the Substrate 705. By way of non-limiting example, a required or preferred stretch characteristic may be provided by using a substrate such as an extensible paper; however, extensible paper may not be appropriate for providing a contraction characteristic. A Substrate 705 that provides both an expanding (stretching) and a contracting (shrinking) characteristic may include a feed stock corrugated along one or both of the longitudinal and axis and a width of the Substrate 705. Corrugation may provide additional features that may have an applied adhesive or not depending upon a particular application and a tendency to transfer adhesive to surfaces with which the substrate comes into contact. For example, in some embodiments, adhesive may only be applied to portions of the corrugation. Coatings to control the effects of humidity on the corrugation may also be applied to provide resistance to corrugations relaxing.

As illustrated in FIG. 7, an orientation of a roll of Substrate 705 may be conducive to a Feed Roller 702-702A proximate to a point of exit from a Dispenser 701, or contained further within the Dispenser 701.

Figure 8:
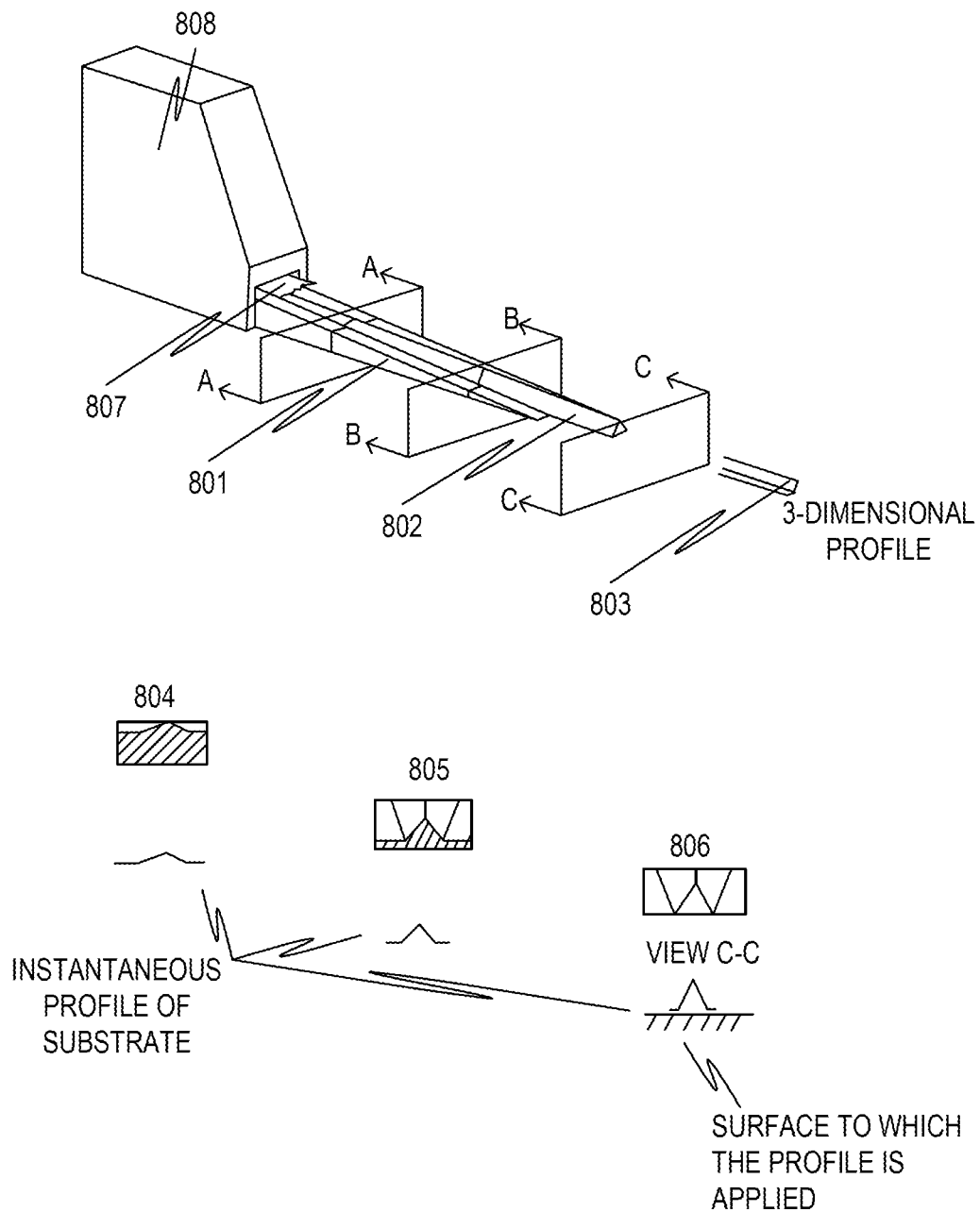
FIG. 8 illustrates a schematic diagram of substrate and forming wand.

Referring now to FIG. 8, in some embodiments, a ratio of a width to length of a portion of a Substrate 807 involved in a forming process to create a 3-dimensional aspect in the Substrate 807 is controlled. For example, forcing a formation of some substrates with a relatively wide cross width in a short distance, may exacerbate a difference in a length of parallel lines. Conversely, lengthening a distance involved in a formation process may reduce the difference. Dynamics of forming a 3-dimensional profile from a 2-dimensional substrate (and a continuous length of adhesive tape in particular) are addressed by the designs of substrate dispensers and profile formers illustrated and described herein.

As illustrated in FIG. 8, a Wand 801 (or other structure with a 3-Dimensional Forming Feature 802) may extend from a housing for Coiled Substrate 808 and include a gradual transformation of a 2-Dimensional form of the Substrate 807 into a substrate with a 3-Dimensional Profile 803. In some embodiments, a rate of taper and corresponding length of a Wand 801 is designed to impart a controlled amount of stress into the Substrate 807. In other embodiments, a rate of taper and corresponding length of a Wand 801 is controllable by a user via a telescopic wand that allows a user to adjust a rate of graduation of transformation of the 2-Dimensional Substrate 807 into a substrate with a 3-Dimensional Profile 803. The Wand 801 may include a Forming Feature 802 and a length of the Wand 801 may include a progressive gradient of Forming Feature 802, such that a proximal end of a Wand 801 may impart a least amount of forming and a distal end may impart a greatest amount of forming.

Sectional Views 804-806 illustrate Instantaneous Profile Views 804-806 of the substrate 807 as a 3-dimensional profile is being generated. Section A-A 804 illustrates a beginning of a desired 3-dimensional profile to be generated. Section B-B 805 illustrates a modest rendition of a desired 3-dimensional profile to be generated; and Section C-C 806 illustrates a desired 3-dimensional profile that has been generated.

Referring now to FIG. 9, in some embodiments, a Guide or Shoe 901 is positioned to receive Substrate 905 from a substrate container 908 and maintained at a set position relative to a structure with a 3-Dimensional Forming Feature 904. The Shoe 901 (or other guide or forming feature) is used to guide the formation of a Substrate 905 into a desired shape as the Substrate 905 reaches a Position of Completion 902. In some embodiments, the Shoe 901 is mounted with a Gap 903 between the Shoe 901 and a surface of the 3-Dimensional Forming Feature 904. Some implementations may include a Gap 903 that is progressively more narrow as the Substrate 905 progresses through the Gap 903.

Additionally, in some implementations, one or both of the Shoe 901 and 3-Dimensional Forming Feature 904 (e.g., a Wand 906) may be coated with a non-stick coating or fashioned from a non-stick material. Non-stick coatings may include, by way of non-limiting example, Teflon, PFA, PTFE (polytetrafluoroethylene), UEMW (Ultra High Molecular Weight Polyethylene), ceramic, nylon, or other material with a suitable molecular structure. The non-stick coating is suitable to prevent the adhesive and substrate from adhering to or fouling the forming apparatus. Surfaces of the Forming Feature 904 involved may also include area limiting formations, such as ridges, which reduce surface area in contact with the adhesive.

In some embodiments, a Shoe 901 may be divided into sections and the 3-Dimensional Forming Feature 904 may be relieved in corresponding sections to reduce surface area.

Figure 10:
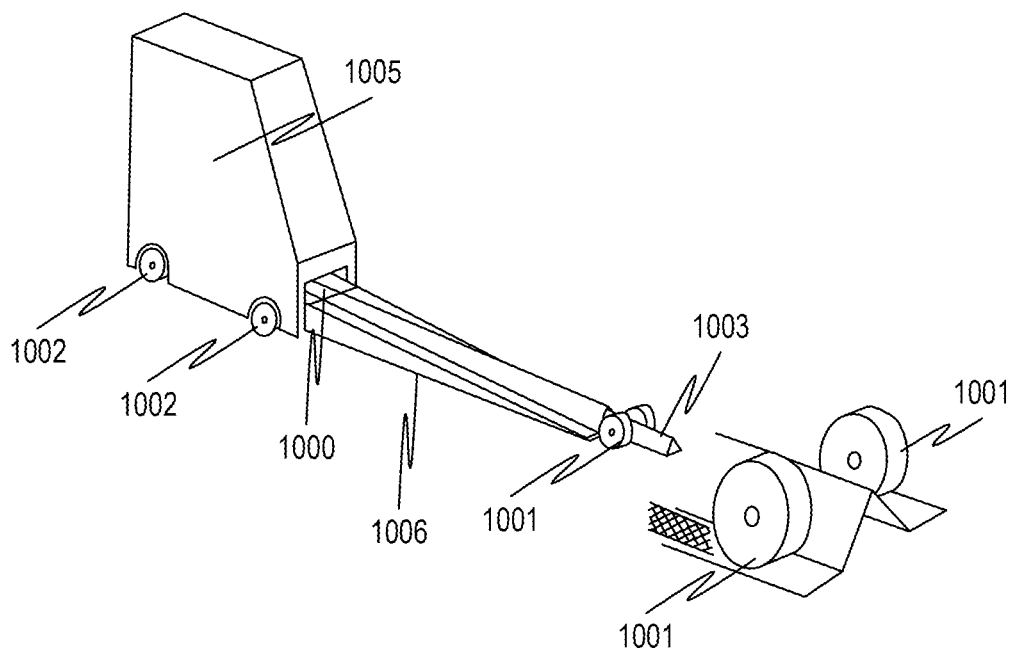
FIG. 10 illustrates a schematic diagram of forming feature and rollers.

Referring now to FIG. 10, some implementations may include the functionality of the achieved via rollers. Specifications of the 3-Dimensional Forming Feature 1003 and guides and characteristics of the Substrate 1601 or composite lamination may influence a type of 3-Dimensional Forming Feature 1003 utilized. As illustrated, a 3-Dimensional Forming Feature 1003 is provided with Forming Rollers 1001 on both sides of a Forming Feature 1003 to press a portion of the Substrate 1000 (sometimes referred to as a foot or feet of the Substrate 1000) to the surface to which the profile is to be applied. In preferred embodiments, adhesion of the Substrate 1000 to a surface to which it will be applied is sufficient to pull the Substrate 1000 through the Wand 1006 or other Forming Feature 1003.

In some embodiments of the methods for application, management of stresses on the Substrate 1000 are managed by controlling how parallel to a receiving surface the applied Substrate 1000 and therefore the Wand 1006 or other Forming Feature 1003 are maintained during the forming of the 2-dimensional substrate into a Substrate 1000 with a 3-dimensional feature. Lifting of a portion of the Forming Feature 1003 (for example, an end of the Forming Feature 1003) may introduce additional stresses into the Substrate 1000.

In some embodiments, Dispenser Rollers 1002 are included to maintain a parallel position of a Dispenser 1005 in relation to a surface to which the Substrate 1000 is being applied. Additionally, in some embodiments, one or more Forming Rollers 1001 may be used in conjunction with the Dispenser Rollers 1002 to maintain an angle of application of the Substrate 1000 in relation to the surface to which the substrate is being applied. For example, a Dispenser Roller 1002 may be used to maintain the Dispenser 1005 and Wand 1006 at a slightly higher position relative to the Forming Rollers 1001 such that the Substrate 1000 is dispensed at a slight angle. Other embodiments may include maintaining the Wand 1006 at a position parallel to the surface to which the Substrate 1000 is being applied.

Figure 11:
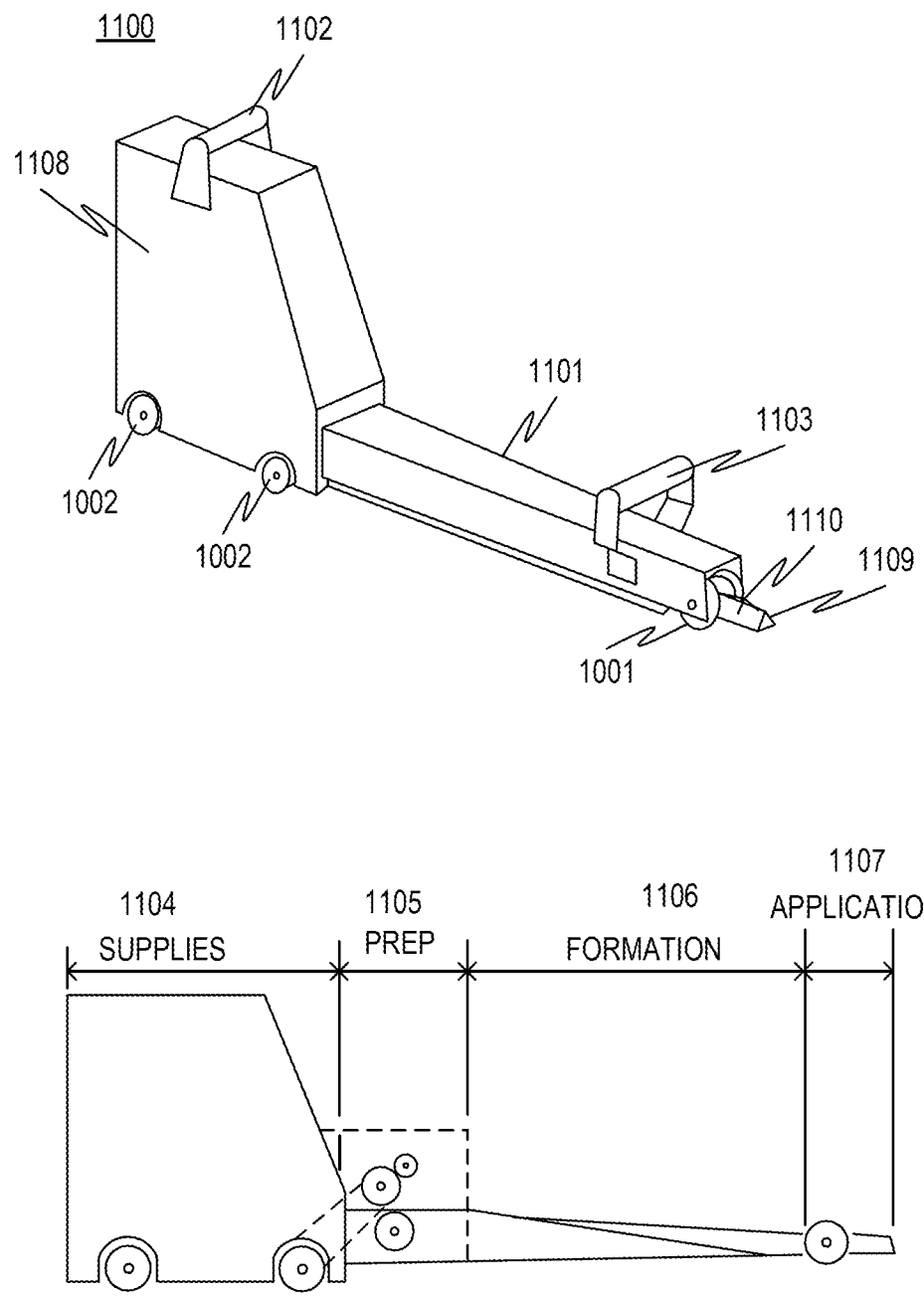
FIG. 11 illustrates a schematic diagram of cover flap protecting a raised profile.

Referring now to FIG. 11, in some embodiments it is preferable to protect an adhesive on a Substrate 1110 dispensed from a Dispenser 1108 from dust, debris, and/or contacting a foreign object. In such embodiments, a Cover 1101 may protect a Forming Feature 1109 and/or a Substrate 1110 positioned on the Forming Feature 1109.

In another aspect, in some embodiments, one or more Handles 1102-1103 may be used to manipulate the application of a Substrate 1110 that has been formed to have a 3-dimensional profile. As illustrated, the Substrate 1110 forming and Application Device 1100 is suitable for use with a linear track or tram wherein the linearity of the receiving surface is conducive to limiting wrinkles or other aberrations in the Substrate 1110 once applied.

Additionally, the Application Device 1100 may have Portions 1104-1107 focused on specific functionalities and/or method steps. Functionalities may include, by way of non-limiting example, Supplying Substrate 1104, preparing the Substrate 1105, Formation of the Substrate into a 3-Dimensional Profile 1106, and Application of the Substrate with a 3-Dimensional Profile onto a Receiving Surface 1107.

Figure 12:
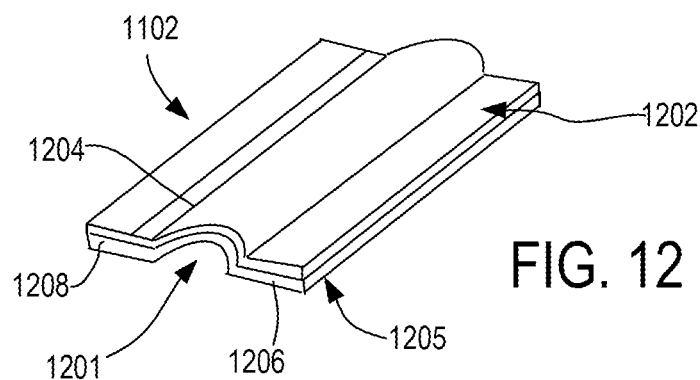
FIG. 12-12A illustrates a cover flap raised profile tape with a formed cavity structure with the cover flap opened.

Referring now to FIG. 12, a Raised Profile Tape 1200 may be assembled and attached in such a manner that a Raised Channel 1201 may be formed. A formed region of the Raised Channel 1201 elevates a Cover Flap 1202. In other ways the structure of the Raised Profile Tape Composite 1200 may be as in other embodiments with a Zone Coated Release Liner Substrate 1204. There may be a Longitudinally Extending Uncoated Joining Region 1205 to define the structure that fixedly holds the Cover Flap 1202 when it opens. The Lower Structure 1206 may be formulated as has been discussed with a Raised Profile Tape Substrate 1208 with a layer of Mounting Side Pressure Sensitive Adhesive 1207 under the Raised Profile Tape Substrate 1200. As in other embodiments, a Web Grabbing Pressure Sensitive Adhesive 1207 may be protected under the Cover Flap 1202.

The Raised Channel 1201 may have a number of effects including that it may present a larger aerodynamic interaction while a spool that the Raised Profile Tape Composite 1200 is attached to is brought up to rotational speed.

Figure 12A:
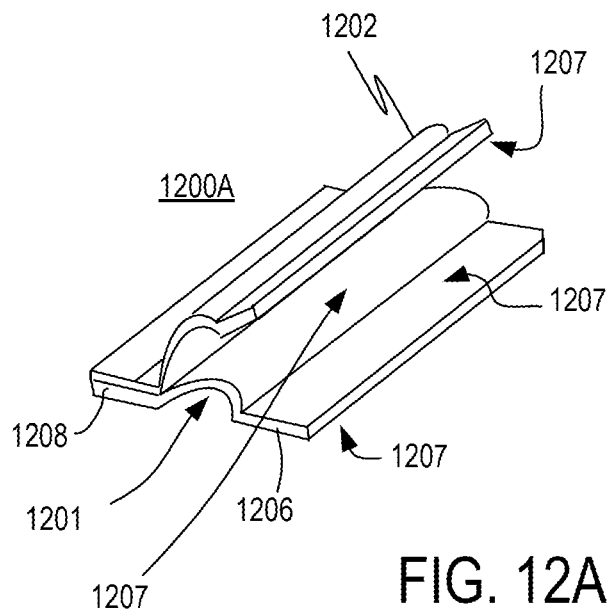

Referring now to FIG. 12A, as the Cover Flap 1202 opens, Web Grabbing Pressure Sensitive Adhesive 1207 is slightly elevated which may enhance the interaction the Pressure Sensitive Adhesive 1207 has with a paper web and may increase aspects such as the pressure that occurs between the Web Grabbing Pressure Sensitive Adhesive 1207 and the paper web.

The Cover Flap 1202 may open into an Open Raised Channel Construct 1200A. The Open Cover Flap 1202 exposes Web Grabbing Adhesive Pressure Sensitive Adhesive 1207. A Raised Channel 1201 elevates the Web Grabbing Adhesive Pressure Sensitive Adhesive 1207 in its regions.

Figure 13:
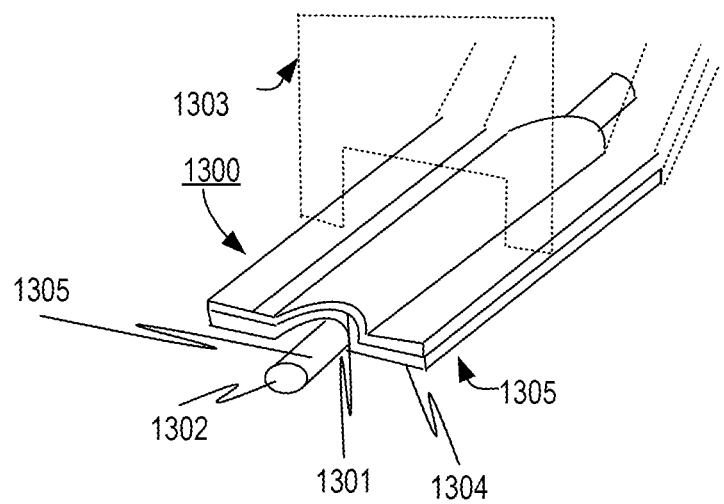
FIG. 13 illustrates an exemplary raised profile tape with a cavity formed over the rod.

Referring to FIG. 13, a schematic diagram illustrates a manner of creating a Raised Profile Tape Composite 1300. A portion of the Raised Profile Tape Composite 1300 is illustrated as applied over a Rod 1302 or similarly shaped protrusion that may be pulled along a surface with the Applicator 1303. The presence of the Rod 1302 may shape the overlying Raised Profile Tape Composite 1300 into a raised channel feature as has been described. The features in dotted lines are examples of features that may be present as the applicator applies the Raised Profile Tape Composite 1300. These features may include portions of Raised Profile Tape Substrate 1304 as it is being applied to the surface as well as a Wiper Feature 1303 which may apply pressure to the surface on the edges of the Raised Profile Tape Substrate 1304 to affix the Pressure Sensitive Tape 1301 to the surface beneath. Since the Rod 1302 or other similarly shaped element experiences a degree of pressure between it and the pressure sensitive adhesive of the Raised Profile Tape Composite 1300, in some embodiments one or both of the Raised Profile Tape Composite 1300 and the Rod 1302 is coated a non-stick surface treatment, such as, for example, a Polytetrafluoroethylene (PTFE) Coating 1305 or other coating.

Figure 14:
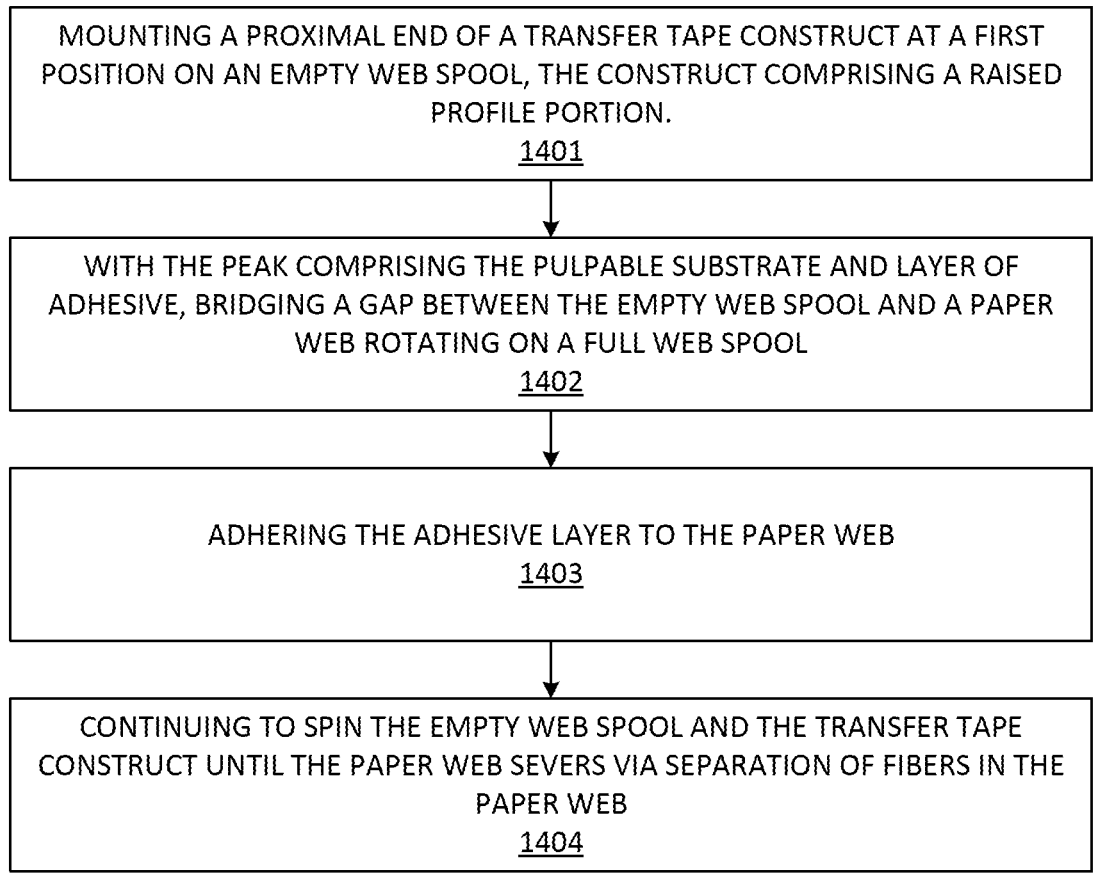
FIG. 14 illustrates exemplary method steps that may be performed in some implementations of the present invention.

Referring now to FIG. 14, a flowchart illustrates method steps that may be for performed according to some embodiments of the present disclosure.

At step 1401, the method may include mounting a proximal end of a Raised Profile Tape Composite at a first position on an empty web spool, the Raised Profile Tape Composite including layers of: adhesive, release coating, and pulpable substrate with a raised profile portion forming a peak with the pulpable substrate and layer of adhesive.

At 1402 the method may include, with the peak comprising the pulpable substrate and layer of adhesive, bridging a gap between the empty web spool and a surface of a paper web rotating on a full web spool.

At 1403 the method may include adhering the adhesive layer to the paper web, such that at 1404 the method may include continuing to spin the empty web spool and the Raised Profile Tape Composite until the paper web severs via separation of fibers included in the paper web. The raised profile portion may include a combination of adhesive, release coating, and pulpable substrate to form a peak with the pulpable substrate and layer of adhesive.

Figure 15:
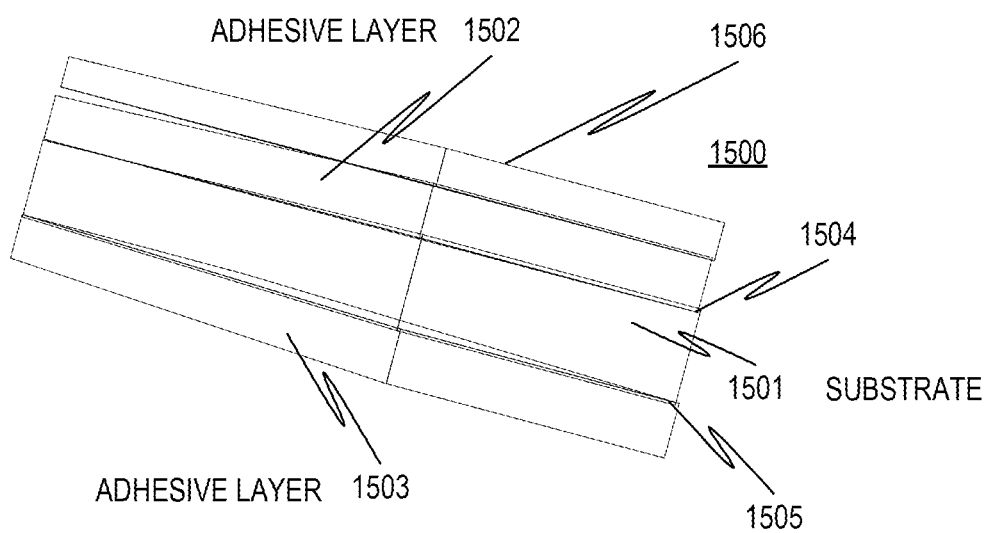
FIG. 15 illustrates an exemplary profile of an adhesive substrate.

Referring now to FIG. 15, layers that may be included in an Adhesive Substrate 1500 are illustrated in an essentially flat two-dimensional form according to some embodiments of the present invention are illustrated. The Adhesive Substrate 1500 may include a Substrate 1501 with a First Side 1504 and a Second Side 1505. The Adhesive Substrate 1500 includes an Adhesive Layer 1502-1503 on one or both of the First Side 1504 and the Second Side 1505 of the Substrate 1501. Some embodiments may additionally include a Release Layer 1506.

Figure 16:
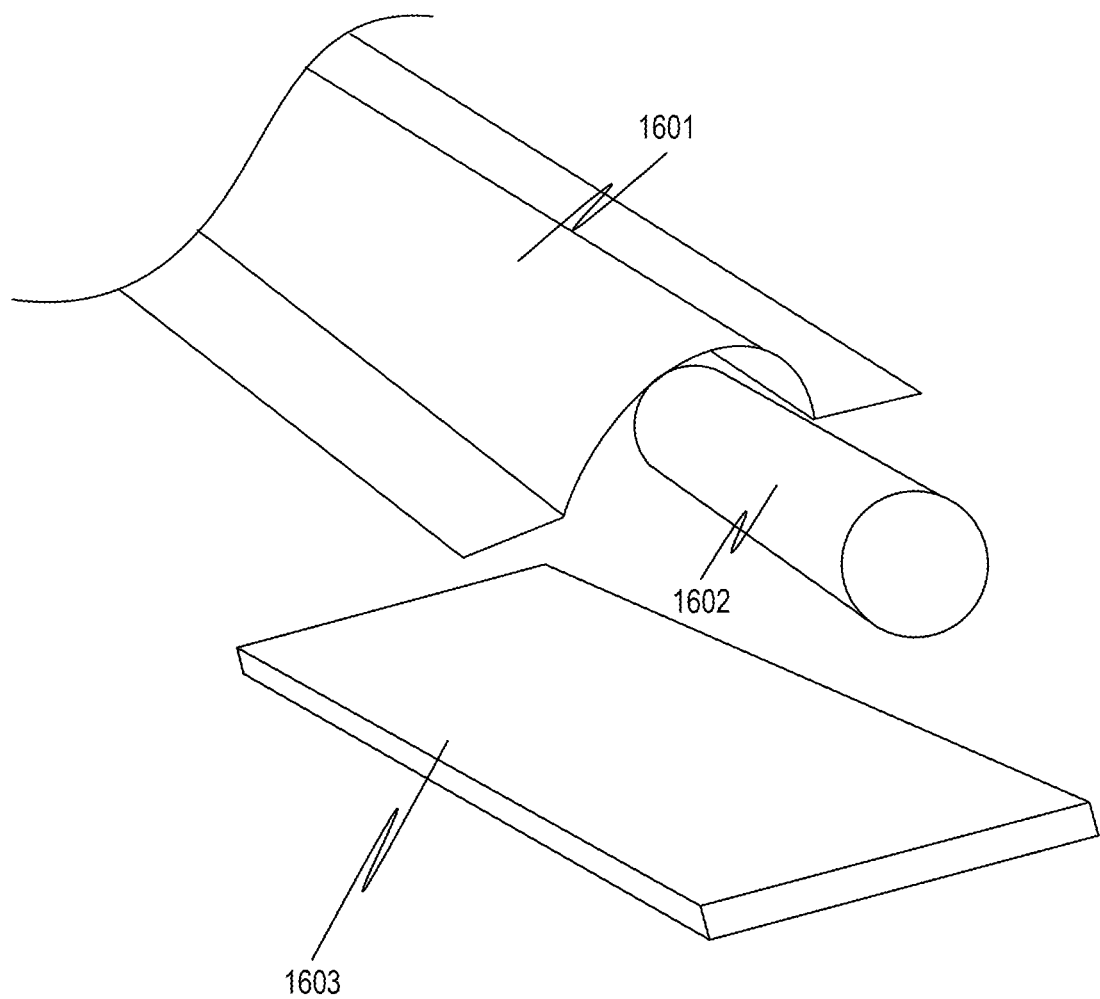
FIG. 16 illustrates exemplary raised profile tape with an item secured beneath the tape.

Referring now to FIG. 16, a 3-Dimensional Substrate 1601 formed from a 2-dimensional substrate has been discussed generally herein in view of applications in a paper making environment; however, the concepts, methods, apparatus, and devices provided herein are also applicable to many industrial, hobby, professional, and personal applications. For example, a Raised Profile Substrate 1601 may be used to one or both of: cover and secure an Article 1602 between the Raised Profile Substrate 1601 and a Receiving Surface 1603. By way of non-limiting example, Articles 1602 conducive to being secured with a Raised Profile Substrate 1601 may include, one or more of: wire(s), cables, electronic devices, sensors, beads of sealant or adhesive, fiber optics, cords, ropes, gaskets, seams (interlocking and/or abutted seams), and almost any other object suitable to being secured by a tape to a surface.

Figure 17:
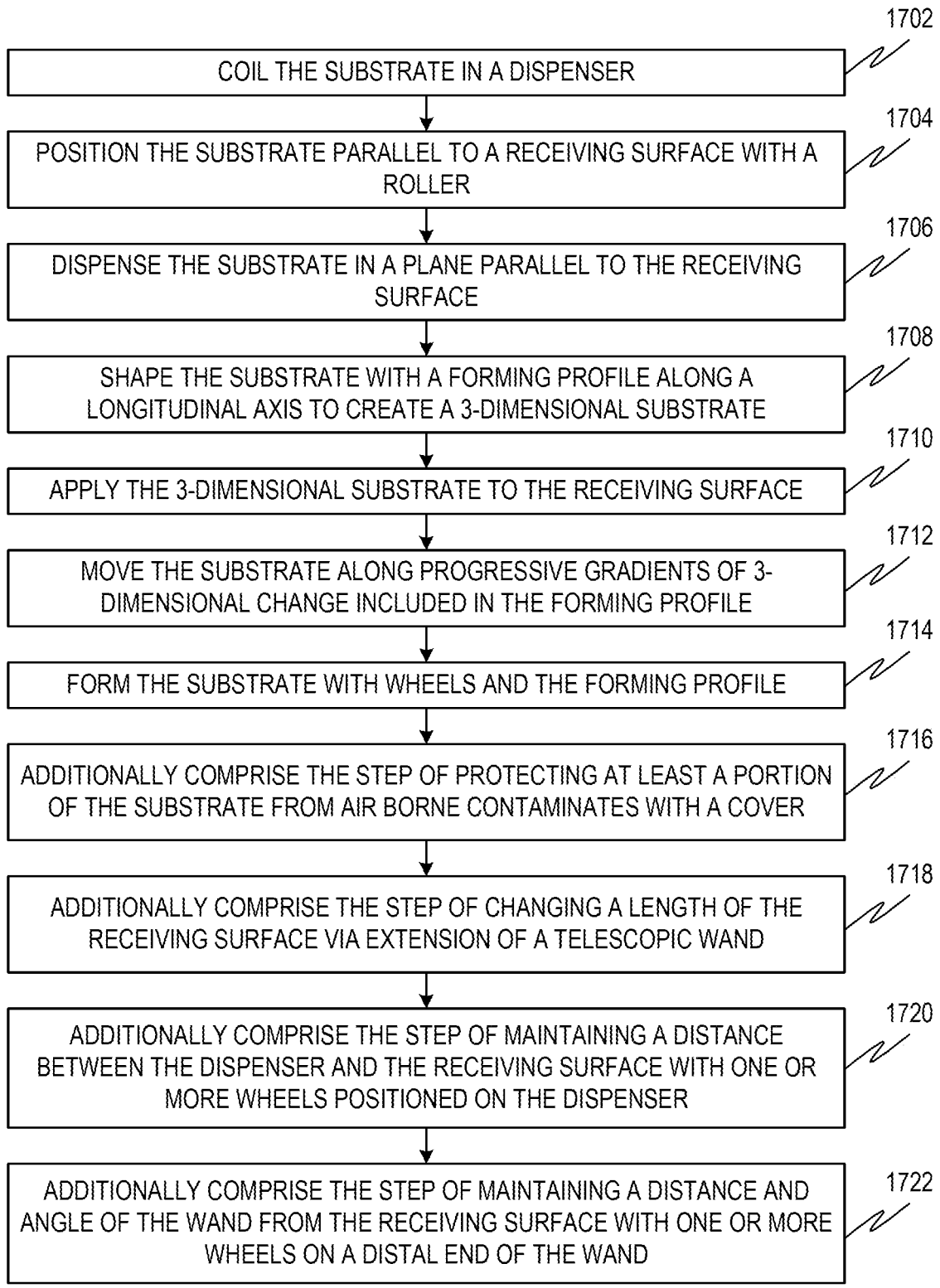
FIG. 17 illustrates method steps that may be practiced in some exemplary implementations of the present invention.

Referring now to FIG. 17, method steps that may be practiced according to the present invention may include coiling the substrate in a dispenser (block 1702). For example, the device may coil the substrate in a dispenser, as described above. As also shown in FIG. 17, methods may include positioning the substrate parallel to a receiving surface with a roller (block 1704). For example, device may position the substrate parallel to a receiving surface with a roller, as described above. As further shown in FIG. 17, process 1700 may include dispensing the substrate in a plane parallel to the receiving surface (block 1706). For example, device may dispense the substrate in a plane parallel to the receiving surface, as described above. As also shown in FIG. 1, the methods may include shaping the substrate with a forming profile along a longitudinal axis to create a 3-dimensional substrate (block 1708). For example, device may shape the substrate with a forming profile along a longitudinal axis to create a 3-dimensional substrate, as described above. As further shown in FIG. 17, the methods may include applying the 3-dimensional substrate to the receiving surface (block 1710). For example, device may apply the 3-dimensional substrate to the receiving surface, as described above.

The method may additionally include the step of moving the substrate along progressive gradients of 3-dimensional change included in the forming profile (block 1712).

The method may additionally include the step of forming the substrate with wheels and the forming profile (block 1714).

The method may additionally include the step of protecting at least a portion of the substrate from air borne contaminants with a cover (block 1716), the air borne contaminants may include paper particles.

The method may additionally include the step of changing a length of the receiving surface via extension of a telescopic wand (block 1718).

The method may additionally include the step of maintaining a distance between the dispenser and the receiving surface with one or more wheels positioned on the dispenser (block 1720).

The method may additionally include the step of maintaining a distance and angle of the wand from the receiving surface with one or more wheels on a distal end of the wand (block 1722).

Although FIG. 17 shows example blocks of the methods, in some implementations, the methods may include additional blocks, fewer blocks, different blocks, or differently arranged blocks than those depicted in FIG. 17. Additionally, or alternatively, two or more of the blocks of the methods may be performed in parallel.

In some embodiments, the method may include continuing to spin, or otherwise rotating the empty web spool following the adhering of the adhesive layer to the paper web and severing of the paper web. The continued rotating of the empty web spool will cause a new roll of paper web to form on the once empty web spool.

In some embodiments, the method may include the step of protecting at least a portion of the adhesive layer from air borne contaminates with folded layers that may include one or more of: adhesive, release coatings, and pulpable substrate. Air borne contaminants may include, for example, paper particles.

Alternatively, a method of dispensing and applying a raised profile tape feature that is crushed while on an empty web spool and used to sever and secure a paper web from a first web spool onto an empty web spool in a web turn-up operation comprising the steps of: winding the raised profile tape onto a raised profile tape spool within a dispenser cartridge housing and extending the raised profile tape through a slot in the housing a slot adapted such that the raised profile tape passes through the slot; the raised profile tape comprising a tape substrate coated on one side with a web grabbing pressure sensitive adhesive and on the other side with a mounting pressure sensitive adhesive, and a release liner having a release liner substrate fully coated on a first side with a release layer and zone-coated on a second side with a release layer, the release layer being of a material that prevents adhesion of the pressure sensitive adhesive to the release liner substrate; the zone-coated release layer defining a longitudinally extending uncoated joining region on a longitudinal edge of the release liner substrate, whereby the web grabbing adhesive adheres to the uncoated joining region of the release liner substrate such that the zone-coated release layer defines a cover flap not adhered to the web grabbing pressure sensitive adhesive; wherein the step of winding the raised profile tape onto the raised profile tape spool includes winding the raised profile tape onto the raised profile tape spool with the release liner facing inward and the mounting side pressure sensitive adhesive facing outward, such that the release layer fully coated on the first side of the release liner substrate prevents adhesion of the mounting side pressure sensitive adhesive to the release liner substrate. Furthermore, the method further comprising the step of passing a segment of the raised profile tape through the slot and applying the raised profile tape to the empty web spool, pressing the raised profile tape onto the empty web spool using a wiper, and cutting the segment of raised profile tape; and/or wherein the step of applying the raised profile tape to the empty web spool includes orienting the raised profile tape on the empty web spool such that the cover flap extends in the direction of rotation of the empty web spool.

Alternatively, a raised profile tape may be formed by assembling a tape substrate coated on one side with a web grabbing adhesive and on the other side with a mounting adhesive and a release liner having a release liner substrate fully coated on a first side with a release layer and zone-coated on a second side with a release layer, the release layer being of a material that prevents adhesion of the adhesive to the release liner substrate.

Alternatively, a raised profile tape may be formed by assembling a tape substrate coated on one side with a web grabbing adhesive and on the other side with a mounting adhesive and a release liner having a release liner substrate fully coated on a first side with a release layer and zone-coated on a second side with a release layer, the release layer being of a material that prevents adhesion of the adhesive to the release liner substrate. In some embodiments, a raised profile tape without a cord may be applied upon the surface of a spool with an associated fixture that maintains the tape away from the surface of the spool in a center portion of the tape while allowing adhesive surface on the perimeter to interact with and adhere to the spool surface. The fixture may be formed with coatings that deter the adhesive from binding.

In some embodiments, the zone-coated release layer may define a longitudinally extending uncoated joining region on the release liner substrate. The web grabbing adhesive may adhere to the uncoated joining region of the release liner substrate such that the zone-coated release layer defines a cover flap not adhered to the web grabbing adhesive.

An elevation of a surface profile may improve the efficacy of adherence to the paper web as the elevated surface profile helps to fill an open nip. In addition to aiding the adherence of the adhesive to the paper web, the novelty of the inventive examples herein may also improve the effectiveness of rupturing the paper web as it severs from the Parent Web Spool. The added height of the raised profile tape concentrates large forces as the spool approaches the Nip and the forces crush the elevated profile. The added energy of the interaction may augment the severing of the web.

Particular embodiments of the subject matter have been described. Other embodiments are within the scope of the following claims. In some cases, the actions recited in the claims can be performed in a different order and still achieve desirable results. In addition, the processes depicted in the accompanying drawings do not necessarily require the particular order show, or sequential order, to achieve desirable results. In certain implementations, multitasking and parallel processing may be advantageous. Nevertheless, it will be understood that various modifications may be made without departing from the spirit and scope of the claimed invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the FIG.s.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

As has been mentioned, the illustrations depict aspects of exemplary embodiments, and the relative scale of illustrated features may be exaggerated for depiction of various aspects. Accordingly, the scale of features illustrated is not intended to limit the scope of the elements of the various embodiments consistent with the present application.

What is claimed is:

1. A method for forming a substrate with a three-dimensional profile, the method comprising steps of:
   a. retaining a coil of two-dimensional substrate with an adhesive layer in a dispenser;
   b. dispensing the two-dimensional substrate onto a dimensional forming feature;
   c. reshaping the two-dimensional substrate to form the substrate with a three-dimensional profile based upon a shape of the dimensional forming feature; and
   d. adhering the substrate with the three-dimensional profile to a receiving surface of an empty web spool.

2. The method of claim 1 additionally comprising steps of: spinning the empty web spool and the substrate with the three-dimensional profile; adhering of the adhesive layer to a paper web on a full web spool; severing the paper web; and continuing to spin the empty web spool and the substrate with the three-dimensional profile to form a roll of paper web on the empty web spool.

3. The method of claim 2 additionally comprising a step of attaching a distal end of the substrate with the three-dimensional profile at a second position on the empty web spool.

4. The method of claim 3 additionally comprising a step of protecting at least a portion of the adhesive layer from airborne contaminants with a cover on the dispenser.

5. The method of claim 4 wherein the airborne contaminants comprise paper particles.

6. The method of claim 4, additionally comprising a step of forming a peak comprising the substrate with a three-dimensional profile and the adhesive layer by placing a rod beneath the adhesive layer.

7. The method of claim 6, additionally comprising a step of contacting the paper web with the peak comprising the substrate with a three-dimensional profile and the adhesive layer.

8. The method of claim 7 additionally comprising a step of compressing the peak comprising the substrate with a three-dimensional profile and the adhesive layer as the empty web spool approaches the paper web.

9. The method of claim 8 additionally comprising the step of: following a collapsing of the peak comprising a pulpable substrate and the adhesive layer, contacting and bonding additional surface area of the adhesive layer with the paper web.

10. The method of claim 7 additionally comprising a step of crushing the peak.

11. The method of claim 10 wherein the substrate with a three-dimensional profile is comprised of one or more materials suitable to be repulped and included in a paper product.

12. The method of claim 11 wherein a cord consists of one or more materials, each of the one or more materials suitable to be repulped and included in the paper product.

13. The method of claim 11 additionally comprising a step of adhering the substrate with a three-dimensional profile to the paper web with the adhesive layer.

14. The method of claim 13 wherein the adhesive layer comprises a pressure sensitive coating.

15. The method of claim 14 wherein the substrate with the three-dimensional profile comprises multiple kiss-cuts.

16. The method of claim 15 wherein the multiple kiss-cuts are placed at one or both of ¼ and ¾ of a width of the substrate with the three-dimensional profile.

17. The method of claim 11 wherein a release layer comprises a portion of a surface treated with a reduced adhesion strength substance.

18. The method of claim 17 wherein the reduced adhesion strength substance comprises a silicon based formulation.

19. The method of claim 11 wherein the substrate with the three-dimensional profile comprises a carrier paper with a repeating pattern of stripes of release coating.

20. The method of claim 10 additionally comprising the step of winding the paper web onto the empty web spool.

* * * * *